(12) United States Patent
Touboul

(10) Patent No.: US 12,301,574 B2
(45) Date of Patent: *May 13, 2025

(54) TRANSACTION SECURITY SYSTEMS AND METHODS

(71) Applicant: CUPP Computing AS, Oslo (NO)

(72) Inventor: Shlomo Touboul, Kefar Haim (IL)

(73) Assignee: CUPP Computing AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,810

(22) Filed: Sep. 6, 2023

(65) Prior Publication Data
US 2024/0250944 A1      Jul. 25, 2024

Related U.S. Application Data

(63) Continuation of application No. 17/158,870, filed on Jan. 26, 2021, now Pat. No. 11,757,885, which is a
(Continued)

(51) Int. Cl.
*H04L 9/40*      (2022.01)
*G06F 21/34*     (2013.01)
(Continued)

(52) U.S. Cl.
CPC .............. *H04L 63/10* (2013.01); *G06F 21/34* (2013.01); *G06F 21/53* (2013.01); *G06F 21/606* (2013.01);
(Continued)

(58) Field of Classification Search
CPC ..... H04L 63/10; H04L 63/20; H04L 63/0236; H04L 63/18; H04L 63/0853; H04L 63/0861; G06F 21/34; G06F 21/53
(Continued)

(56) References Cited

U.S. PATENT DOCUMENTS

| | | |
|---|---|---|
| H1944 H | 2/2001 | Cheswick |
| 6,286,087 B1 | 9/2001 | Ito |
| (Continued) | | |

FOREIGN PATENT DOCUMENTS

| | | |
|---|---|---|
| WO | 2000078008 | 12/2000 |
| WO | 2004030308 | 4/2004 |
| (Continued) | | |

OTHER PUBLICATIONS

Breeden II, John et al., "A Hardware Firewall You Take With You," Government Computer News, located at http:/gcn.com/Articles/2005/06/01/A-hardware-firewall-you-take-with-you.aspx?p=1, Jun. 1, 2005.
(Continued)

*Primary Examiner* — Catherine Thiaw
*Assistant Examiner* — Nega Woldemariam
(74) *Attorney, Agent, or Firm* — Sheppard Mullin Richter & Hampton LLP

(57) ABSTRACT

Outbound traffic of a host application may be received from a host device having a host processor. The secure resource may be configured to provide a secure transaction based on the outbound network traffic. Using a second processor different than the host processor, it may be determined whether the host application is authorized to provide the outbound network traffic to the secure resource. The outbound network traffic may be allowed to be forwarded to the secure resource if the host application is authorized. The outbound network traffic may be disallowed to be forwarded to the secure resource if the host application is not authorized.

19 Claims, 15 Drawing Sheets

Related U.S. Application Data continuation of application No. 16/551,200, filed on Aug. 26, 2019, now Pat. No. 10,904,254, which is a continuation of application No. 15/924,108, filed on Mar. 16, 2018, now Pat. No. 10,397,227, which is a continuation of application No. 14/050,279, filed on Oct. 9, 2013, now Pat. No. 9,973,501.

(60) Provisional application No. 61/711,666, filed on Oct. 9, 2012, provisional application No. 61/713,449, filed on Oct. 12, 2012.

(51) Int. Cl.
  G06F 21/53 (2013.01)
  G06F 21/60 (2013.01)

(52) U.S. Cl.
  CPC .......... H04L 63/0236 (2013.01); H04L 63/18 (2013.01); H04L 63/20 (2013.01); *H04L 63/0853* (2013.01); *H04L 63/0861* (2013.01)

(58) Field of Classification Search
  USPC .................................................. 726/1
  See application file for complete search history.

(56) References Cited

U.S. PATENT DOCUMENTS

| | | |
|---|---|---|
| 6,466,779 B1 | 10/2002 | Moles |
| 6,725,294 B1 | 4/2004 | Moore et al. |
| 6,772,345 B1 | 8/2004 | Shetty |
| 6,813,682 B2 | 11/2004 | Bress |
| 7,036,143 B1 | 4/2006 | Leung |
| 7,065,644 B2 | 6/2006 | Daniell |
| 7,069,330 B1 | 6/2006 | McArdle |
| 7,076,690 B1 | 7/2006 | Todd |
| 7,086,089 B2 | 8/2006 | Hrastar |
| 7,131,141 B1 | 10/2006 | Blewett |
| 7,168,089 B2 | 1/2007 | Nguyen |
| D537,036 S | 2/2007 | Chen |
| 7,184,554 B2 | 2/2007 | Freese |
| 7,197,638 B1 | 3/2007 | Grawrock |
| 7,283,542 B2 | 10/2007 | Mitchell |
| 7,353,533 B2 | 4/2008 | Wright |
| 7,359,983 B1 | 4/2008 | Maufer |
| 7,360,242 B2 | 4/2008 | Syvanne |
| 7,418,253 B2 | 8/2008 | Kavanagh |
| 7,529,932 B1 | 5/2009 | Haustein |
| 7,539,828 B2 | 5/2009 | Lomnes |
| 7,657,941 B1 | 2/2010 | Zaitsev |
| 7,665,137 B1 | 2/2010 | Barton |
| 7,818,803 B2 | 10/2010 | Gordon |
| 7,894,480 B1 | 2/2011 | Wang et al. |
| 7,908,476 B2 | 3/2011 | Kandasamy |
| 7,971,258 B1 | 6/2011 | Liao et al. |
| 7,984,479 B2 | 7/2011 | Brabson |
| 7,992,199 B1 | 8/2011 | Winick |
| 8,145,733 B1 | 3/2012 | Cheng et al. |
| 8,180,654 B2 | 5/2012 | Berkman |
| 8,218,449 B2 | 7/2012 | Taylor |
| 8,218,558 B2 | 7/2012 | Tan |
| 8,234,261 B2 | 7/2012 | Monahan |
| 8,239,531 B1 | 8/2012 | Bellovin |
| 8,266,670 B1 | 9/2012 | Merkow |
| 8,321,934 B1 | 11/2012 | Cooley |
| 8,365,272 B2 | 1/2013 | Touboul |
| 8,402,528 B1 | 3/2013 | McCorkendale |
| 8,495,290 B2 | 7/2013 | Sugar et al. |
| 8,495,700 B2 | 7/2013 | Shahbazi |
| 8,631,488 B2 | 1/2014 | Oz |
| RE45,009 E | 7/2014 | Vange et al. |
| 8,789,202 B2 | 7/2014 | Touboul et al. |
| 8,904,523 B2 | 12/2014 | Gordon |
| 8,978,132 B2 | 3/2015 | Henry |
| 9,202,070 B2 | 12/2015 | Rajakarunanayake et al. |
| 9,332,028 B2 | 5/2016 | Xaypanya et al. |
| 9,438,631 B2 | 9/2016 | Bettini |
| 9,565,202 B1 | 2/2017 | Kindlund |
| 9,747,444 B1 | 8/2017 | Touboul |
| 9,762,614 B2 | 9/2017 | Ely |
| 9,832,603 B2 | 11/2017 | Schlaupitz |
| 9,847,020 B2 | 12/2017 | Davis |
| 9,910,979 B2 | 3/2018 | Ben-Haim |
| 9,916,439 B2 | 3/2018 | Jakubowski et al. |
| 10,162,975 B2 | 12/2018 | Ely |
| 10,291,656 B2 | 5/2019 | Ely |
| 10,417,421 B2 | 9/2019 | Touboul |
| 10,496,834 B2 | 12/2019 | Ely |
| 10,666,688 B2 | 5/2020 | Ely |
| 11,316,905 B2 | 4/2022 | Ely |
| 11,743,297 B2 | 8/2023 | Ely |
| 11,979,370 B2 | 5/2024 | McDonald |
| 12,026,261 B2 | 7/2024 | Wyatt et al. |
| 2001/0014102 A1 | 8/2001 | Mattingly |
| 2002/0095540 A1 | 7/2002 | Zolnowsky |
| 2002/0111824 A1 | 8/2002 | Grainger |
| 2002/0193015 A1 | 12/2002 | Milan |
| 2003/0046397 A1 | 3/2003 | Trace |
| 2003/0055994 A1 | 3/2003 | Herrmann |
| 2003/0070084 A1 | 4/2003 | Satomaa |
| 2003/0084319 A1 | 5/2003 | Tarquini et al. |
| 2003/0097431 A1 | 5/2003 | Dill |
| 2003/0097589 A1 | 5/2003 | Syvanne |
| 2003/0110391 A1 | 6/2003 | Wolff |
| 2003/0126468 A1 | 7/2003 | Markham |
| 2003/0131245 A1 | 7/2003 | Linderman |
| 2003/0142683 A1 | 7/2003 | Lam |
| 2003/0148656 A1 | 8/2003 | Huang |
| 2003/0182415 A1 | 9/2003 | Vicard |
| 2003/0224758 A1 | 12/2003 | O'Neill |
| 2003/0229808 A1 | 12/2003 | Heintz et al. |
| 2004/0003262 A1 | 1/2004 | England |
| 2004/0019656 A1 | 1/2004 | Smith |
| 2004/0064575 A1 | 4/2004 | Rasheed |
| 2004/0078568 A1 | 4/2004 | Pham et al. |
| 2004/0085944 A1 | 5/2004 | Boehm |
| 2004/0093520 A1 | 5/2004 | Lee |
| 2004/0123153 A1 | 6/2004 | Wright |
| 2004/0148450 A1 | 7/2004 | Chen et al. |
| 2004/0177274 A1 | 9/2004 | Aroya |
| 2004/0199763 A1 | 10/2004 | Freund |
| 2004/0203296 A1 | 10/2004 | Moreton |
| 2004/0210775 A1 | 10/2004 | Gbadegesin |
| 2004/0237079 A1 | 11/2004 | Cox |
| 2005/0055578 A1 | 3/2005 | Wright |
| 2005/0091522 A1 | 4/2005 | Hearn |
| 2005/0109841 A1 | 5/2005 | Ryan |
| 2005/0114711 A1 | 5/2005 | Hesselink |
| 2005/0114870 A1 | 5/2005 | Song |
| 2005/0149757 A1 | 7/2005 | Corbett |
| 2005/0182883 A1 | 8/2005 | Overtoom |
| 2005/0208967 A1 | 9/2005 | Buniatyan |
| 2005/0254455 A1 | 11/2005 | Plehn |
| 2005/0260996 A1 | 11/2005 | Groenendaal |
| 2005/0265385 A1 | 12/2005 | Cromer |
| 2005/0278544 A1 | 12/2005 | Baxter |
| 2006/0020723 A1 | 1/2006 | Chia-Chun |
| 2006/0022802 A1 | 2/2006 | Bridgelall |
| 2006/0031940 A1 | 2/2006 | Rozman |
| 2006/0037071 A1 | 2/2006 | Rao |
| 2006/0056317 A1 | 3/2006 | Manning |
| 2006/0059092 A1 | 3/2006 | Burshan |
| 2006/0064391 A1 | 3/2006 | Petrov |
| 2006/0070129 A1 | 3/2006 | Sobel et al. |
| 2006/0074896 A1 | 4/2006 | Thomas |
| 2006/0075494 A1 | 4/2006 | Bertman |
| 2006/0075501 A1 | 4/2006 | Thomas |
| 2006/0085528 A1 | 4/2006 | Thomas |
| 2006/0095595 A1 | 5/2006 | Dalton et al. |
| 2006/0101277 A1 | 5/2006 | Meenan et al. |
| 2006/0161985 A1 | 7/2006 | Zhao |
| 2006/0174342 A1 | 8/2006 | Zaheer |
| 2006/0206300 A1 | 9/2006 | Garg et al. |
| 2006/0224794 A1 | 10/2006 | Stevens |

(56) References Cited

U.S. PATENT DOCUMENTS

| | | |
|---|---|---|
| 2006/0229741 A1 | 10/2006 | Achanta |
| 2006/0230199 A1 | 10/2006 | Yu |
| 2006/0242686 A1 | 10/2006 | Toda |
| 2006/0272020 A1 | 11/2006 | Gardner |
| 2006/0277405 A1 | 12/2006 | Bowler |
| 2007/0005987 A1 | 1/2007 | Durham |
| 2007/0022474 A1 | 1/2007 | Rowett |
| 2007/0050426 A1 | 3/2007 | Dubal et al. |
| 2007/0058642 A1 | 3/2007 | Eisink |
| 2007/0061887 A1 | 3/2007 | Hoover |
| 2007/0083939 A1 | 4/2007 | Fruhauf |
| 2007/0097976 A1 | 5/2007 | Wood |
| 2007/0104197 A1 | 5/2007 | King |
| 2007/0110053 A1 | 5/2007 | Soni et al. |
| 2007/0118874 A1 | 5/2007 | Adams |
| 2007/0118893 A1 | 5/2007 | Crawford |
| 2007/0123214 A1 | 5/2007 | Mock |
| 2007/0124536 A1 | 5/2007 | Carper |
| 2007/0130433 A1 | 6/2007 | Safa |
| 2007/0130457 A1 | 6/2007 | Kamat |
| 2007/0143827 A1 | 6/2007 | Nicodemus |
| 2007/0143851 A1 | 6/2007 | Nicodemus |
| 2007/0162582 A1 | 7/2007 | Belali et al. |
| 2007/0192500 A1 | 8/2007 | Lum |
| 2007/0192854 A1 | 8/2007 | Kelley |
| 2007/0199060 A1 | 8/2007 | Touboul |
| 2007/0199061 A1 | 8/2007 | Byres |
| 2007/0209067 A1 | 9/2007 | Fogel |
| 2007/0214369 A1 | 9/2007 | Roberts |
| 2007/0220187 A1 | 9/2007 | Kates |
| 2007/0233842 A1 | 10/2007 | Roberts |
| 2007/0240217 A1 | 10/2007 | Tuvell |
| 2007/0261112 A1 | 11/2007 | Todd |
| 2007/0266265 A1 | 11/2007 | Zmudzinski |
| 2007/0281664 A1 | 12/2007 | Kaneko |
| 2007/0294744 A1 | 12/2007 | Alessio |
| 2008/0016339 A1 | 1/2008 | Shukla |
| 2008/0034419 A1 | 2/2008 | Mullick |
| 2008/0066148 A1 | 3/2008 | Lim |
| 2008/0083030 A1 | 4/2008 | Durham et al. |
| 2008/0083037 A1 | 4/2008 | Kruse |
| 2008/0084799 A1 | 4/2008 | Repasi |
| 2008/0098478 A1 | 4/2008 | Vaidya |
| 2008/0109871 A1 | 5/2008 | Jacobs |
| 2008/0114990 A1 | 5/2008 | Hilbert |
| 2008/0120423 A1 | 5/2008 | Hall et al. |
| 2008/0134163 A1 | 6/2008 | Golde |
| 2008/0141349 A1 | 6/2008 | Lyle |
| 2008/0165957 A1 | 7/2008 | Kandasamy et al. |
| 2008/0201264 A1 | 8/2008 | Brown |
| 2008/0235755 A1 | 9/2008 | Blaisdell |
| 2008/0282337 A1 | 11/2008 | Crawford |
| 2008/0307240 A1 | 12/2008 | Dahan et al. |
| 2009/0019223 A1 | 1/2009 | Lection |
| 2009/0054075 A1 | 2/2009 | Boejer |
| 2009/0106556 A1 | 4/2009 | Hamid |
| 2009/0135751 A1 | 5/2009 | Hodges et al. |
| 2009/0143057 A1 | 6/2009 | Arun et al. |
| 2009/0165132 A1 | 6/2009 | Jain |
| 2009/0249465 A1 | 10/2009 | Touboul |
| 2009/0253454 A1 | 10/2009 | Sampson |
| 2009/0254993 A1 | 10/2009 | Leone |
| 2010/0064341 A1 | 3/2010 | Aldera |
| 2010/0186093 A1 | 7/2010 | Aussel |
| 2010/0195833 A1 | 8/2010 | Priestley |
| 2010/0218012 A1 | 8/2010 | Joseph et al. |
| 2010/0225493 A1 | 9/2010 | Zishaan |
| 2010/0242109 A1 | 9/2010 | Lee |
| 2010/0251369 A1 | 9/2010 | Grant |
| 2010/0269172 A1 | 10/2010 | Xie |
| 2010/0333088 A1 | 12/2010 | Rogel |
| 2011/0023118 A1 | 1/2011 | Wright |
| 2011/0154443 A1 | 6/2011 | Thakur |
| 2011/0154477 A1 | 6/2011 | Parla |
| 2011/0182180 A1 | 7/2011 | Riddle |
| 2011/0264931 A1 | 10/2011 | Chang et al. |
| 2011/0268106 A1 | 11/2011 | Dalton, Jr. |
| 2011/0269397 A1 | 11/2011 | Bella |
| 2011/0296397 A1 | 12/2011 | Vidal et al. |
| 2012/0005756 A1 | 1/2012 | Hoefelmeyer |
| 2012/0030750 A1 | 2/2012 | Bhargava et al. |
| 2012/0042391 A1 | 2/2012 | Risan |
| 2012/0054744 A1 | 3/2012 | Singh |
| 2012/0084831 A1 | 4/2012 | Hu |
| 2012/0110320 A1 | 5/2012 | Kumar |
| 2012/0110331 A1 | 5/2012 | Falk |
| 2012/0149350 A1 | 6/2012 | Fan |
| 2012/0173609 A1 | 7/2012 | Kulaga |
| 2012/0185846 A1 | 7/2012 | Recio |
| 2012/0216273 A1* | 8/2012 | Rolette ............... G06F 21/577 726/13 |
| 2012/0233695 A1* | 9/2012 | Mahaffey ............. G06F 21/56 726/23 |
| 2012/0239739 A1* | 9/2012 | Manglik ............... G06F 8/61 709/203 |
| 2012/0240183 A1 | 9/2012 | Sinha |
| 2012/0240236 A1* | 9/2012 | Wyatt .................. G06F 21/10 726/25 |
| 2012/0254608 A1* | 10/2012 | Ho ...................... H04L 45/38 713/153 |
| 2012/0278543 A1 | 11/2012 | Yu et al. |
| 2012/0303971 A1 | 11/2012 | Palka |
| 2012/0324504 A1 | 12/2012 | Archer et al. |
| 2013/0031601 A1 | 1/2013 | Bott |
| 2013/0041931 A1* | 2/2013 | Brand .................. H04L 67/02 709/203 |
| 2013/0064373 A1 | 3/2013 | Hagbard |
| 2013/0074144 A1* | 3/2013 | Narayanaswamy .... H04L 63/10 726/1 |
| 2013/0091534 A1 | 4/2013 | Gilde |
| 2013/0097659 A1 | 4/2013 | Das |
| 2013/0097660 A1 | 4/2013 | Das |
| 2013/0133023 A1* | 5/2013 | Burstein ............. H04L 63/0892 726/1 |
| 2013/0254829 A1 | 9/2013 | Jakubowski et al. |
| 2014/0032314 A1 | 1/2014 | Gieseke |
| 2014/0058679 A1 | 2/2014 | Varoglu |
| 2014/0101716 A1* | 4/2014 | Touboul ............... H04L 63/20 726/1 |
| 2014/0317679 A1 | 10/2014 | Wade |
| 2016/0105847 A1 | 4/2016 | Smith |
| 2016/0234204 A1 | 8/2016 | Rishi |
| 2017/0039367 A1 | 2/2017 | Ionescu |
| 2017/0103647 A1 | 4/2017 | Davis |
| 2019/0238538 A1 | 8/2019 | Shaw et al. |
| 2019/0268302 A1 | 8/2019 | McDonald |
| 2020/0285752 A1 | 9/2020 | Wyatt et al. |
| 2023/0076156 A1 | 3/2023 | Abotabl et al. |

FOREIGN PATENT DOCUMENTS

| | | |
|---|---|---|
| WO | 2006069041 | 6/2006 |
| WO | 2007110094 | 10/2007 |
| WO | 2008154726 | 12/2008 |
| WO | 2009004452 | 1/2009 |
| WO | 2010004296 | 1/2010 |
| WO | 2013016663 | 1/2013 |

OTHER PUBLICATIONS

Claessens, Joris et al., "(How) Can Mobile Agents Do Secure Electronic Transactions on Mobile Hosts? A Survey of the Security Issues and the Current Solutions," ACM Transactions on Internet Technology, vol. 3, No. 1, pp. 28-48, Feb. 2003.

CyberGuard Corporation, "Model 1: Wireless Mobile Security Appliance," located at http://support2.cyberguard.com/products/oem/model1.htm, 2005.

Dong et al., "An Opportunistic Scheduler to Balance Performance Measures and Energy Consumption in Wireless Networks: Design and Implementation," Proceedings of the First International Conference on Wireless Internet (WICON'05) (Year: 2005), Conference Paper, Publisher: IEEE, 8 pages.

(56) References Cited

OTHER PUBLICATIONS

Entry, Inc., "CyberGuard Develops a Custom Mobile Security Appliance," SecurityProNews, located at http://www.securitypronews.com/news/securitynews/spn-45-20041007CyberGuardDevelo . . . , Oct. 7, 2004.

Fielding, R. et al., "Hypertext Transfer Protocol—HTTP/1.1," I.E.T.F. Network Working Group, RFC 2616, Jun. 1999.

Hall, Marty, "Core Web Programming: Chapter 16—The Hypertext Transfer Protocol," Prentice Hall PTR, ISBN 0-13-625666-X, pp. 867-911, Dec. 1997.

Hall, Marty, "More Servlets and JavaServer Pages: Chapter 2—A Fast Introduction to Basic Servlet Programming," Prentice Hall PTR, ISBN 0-13-067614-4, pp. 34-118, Dec. 1997.

"Helping Users Deal with Digital Threats: The Online User Supervision Architecture", Living with Insecurity, IEEE Security & Privacy, IEEE Computer and Reliability Societies, downloaded from <URL: https://ieeexplore.ieee.org/stamp/stamp.jsp?tp=&arnumber=5959149>, Nov./Dec. 2011 (Year: 2011), pp. 29-35.

Henmi, Anne et al., "Firewall Policies and VPN Configurations," Syngress Publishing, Inc., ISBN 1-59749-088-1, pp. 99-133, 291-313, Dec. 2006.

Jakobsson, Markus, "Invasive Browser Sniffing and Countermeasures," Proceedings of the 15th International Conference on World Wide Web, pp. 523-532, May 23, 2006.

Kent, S. et al., "Security Architecture for the Internet Protocol," I.E.T.F. Network Working Group, RFC 4301, pp. 10-11, Dec. 2005.

Lee, Henry C.J. et al., "Port Hopping for Resilient Networks," IEEE 60th Vehicular Technology Conference (VTC2004), Sep. 26, 2004.

Liang et al., "Passive Wake-up Scheme for Wireless Sensor Networks", Second International Conference on Innovative Computing, Information and Control, 2007, 4 pages.

Lim et al., "Adaptice power controllable retrodirective array system for wireless sensor server applications", IEEE Transactions on Microwave Theory and Techniques, vol. 53, No. 12, Dec. 2005, pp. 3735-3743.

"Method and System to Provide Automatic Parental Control in Television Broadcasting Environment", downloaded through IP.com, IP.com No. IPCOM000221537D, Sep. 7, 2012 (Year: 2012), 3 pages.

O'Brien, Kevin J., "Microsoft Hit by Antitrust Complaint for Browser," The International Herald Tribune, Dec. 14, 2007.

PMC-Sierra, Inc., "MSP8120 Multi-Service Security Processor," Product Brief, 2007.

Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.

Russo, Alejandro, et al., "Securing Interaction Between Threads and the Scheduler," Proceedings of the 19th IEEE Computer Security Foundations Workshop ( CSFW'06), (Year: 2006), Conference Paper, Publisher: IEEE, 13 pages.

Sen, Subhabrata et al., "Accurate, Scalable In-Network, Identification of P2P Traffic Using Application Signatures," Proceedings of the 13th International Conference on World Wide Web, pp. 512-521, May 17, 2004.

Shreeve, Jimmy Lee, "Hasta la Vista, Microsoft !; It's Faster than Windows, It Fights Viruses—and It's Free," Independent Extra, Aug. 29, 2007.

Shuler, Rus, "How Does the Internet Work," white paper, 2002 [retrieved online at https://web.stanford.edu/class/msande91si/www-spr04/readings/week1/InternetWhitepaper.htm on Dec. 11, 2018].

Srisuresh, P. et al., "IP Network Address Translator (NAT) Terminology and Considerations," I.E.T.F. Network Working Group, RFC 2663, Aug. 1999.

Srisuresh, P. et al., "Traditional IP Network Address Translator (Traditional Nat)," I.E.T.F. Network Working Group, RFC 3022, Jan. 2001.

WatchGuard Technologies, Inc., "Mobile User VPN and PPTP," Internet Security Handbook, copyright 1998-2001, pp. 1-2, located at http://www.watchguard.com/help/Iss/41 /handbook/vpn3.htm, believe published Jun. 5, 2003.

World Wide Web Consortium (W3C), "HTTP Request Fields," May 3, 1994 [retrieved online at https://web.archive.org/web/20060110150527/http://www.w3.org:80/Protocols/HTTP/HTRQ_Headers.html on Jan. 24, 2019].

ZyXEL Communications Corp., "ZyXEL Releases Worlds First Palm-Sized Portable Personal Firewall for Ultimate Security: ZyWALL P1 Pushes Network Security to the End-Point PC's with Minimum Administration Effort," ZyXEL News, located at http://global.zyxel.com/news/press.php?indexflag=20050310013432, Mar. 8, 2005.

European Patent Application No. 06821641.5, Examination Report dated Dec. 16, 2016.

European Patent Application No. 06821641.5, Search Report dated May 17, 2011.

European Patent Application No. 08847968.8, Search Report dated Oct. 25, 2011.

European Patent Application No. 13845746.0, Search Report dated Jun. 7, 2016.

International Application No. PCT/IL2006/001428, International Search Report and Written Opinion dated Jul. 15, 2008.

International Application No. PCT/IL2008/000740, International Search Report and Written Opinion dated Nov. 5, 2008.

International Application No. PCT/US2008/055942, International Search Report and Written Opinion dated Apr. 6, 2009.

International Application No. PCT/US2009/065204, International Search Report and Written Opinion dated Jan. 13, 2010.

International Application No. PCT/US2013/064161, International Search Report and Written Opinion dated Apr. 18, 2014.

International Application No. PCT/US2014/045826, International Search Report and Written Opinion dated Oct. 30, 2014.

International Application No. PCT/US2015/015970, International Search Report and Written Opinion dated May 28, 2015.

Decision—Institution of Inter Partes Review of U.S. Pat. No. 9,781,164 entered Jun. 25, 2019, 28 pages.

Decision—Institution of Inter Partes Review of U.S. Pat. No. 8,631,488 entered Aug. 28, 2019, 39 pages.

Decision—Institution of Inter Partes Review of U.S. Pat. No. 9,106,683 entered Aug. 28, 2019, 39 pages.

Decision—Institution of Inter Partes Review of U.S. Pat. No. 9,843,595 entered Aug. 28, 2019, 33 pages.

Decision—Institution of Inter Partes Review of U.S. Pat. No. 8,365,272 entered Jul. 26, 2019, 27 pages.

Decision—Institution of Inter Partes Review of U.S. Pat. No. 9,756,079 entered Jul. 26, 2019, 32 pages.

Decision—Institution of Inter Partes Review of U.S. Pat. No. 8,789,202 entered Sep. 18, 2019, 33 pages.

Trend Micro Inc. v. CUPP Computing AS, IPR2019-00765, U.S. Pat. No. 9,843,595, Judgment Final Written Decision Determining All Challenged Claims Unpatentable entered Aug. 25, 2020, 47 pages.

Trend Micro Inc. v. CUPP Computing AS, IPR2019-00803, U.S. Pat. No. 8,789,202, Judgment Final Written Decision Determining No Challenged Claims Unpatentable entered Sep. 15, 2020, 30 pages.

CUPP Cybersecurity, LLC and CUPP Computing AS v. Trend Micro, Inc., Trend Micro America, Inc., and Trend Micro Incorporated, Case No. 3:20-cv-03206-K, Complaint for Patent Infringement, filed Oct. 20, 2020, 99 pages.

CUPP Cybersecurity, LLC and CUPP Computing AS v. Trend Micro, Inc., Trend Micro America, Inc., and Trend Micro Incorporated, Case No. 20-cv-03206-M, First Amended Complaint for Patent Infringement, filed Apr. 23, 2021, 140 pages.

Decision Granting Institution of Inter Partes Review of U.S. Pat. No. 10,621,344 entered Oct. 25, 2021, 38 pages.

Decision Granting Institution of Inter Partes Review of U.S. Pat. No. 10,951,632 entered Jan. 19, 2022, IPR2021-01236, 46 pages.

Decision Granting Institution of Inter Partes Review of U.S. Pat. No. 10,951,632 entered Jan. 19, 2022, IPR2021-01237, 25 pages.

(56) References Cited

OTHER PUBLICATIONS

Trend Micro Inc. v. CUPP Computing AS, IPR2021-00813, U.S. Pat. No. 10,621,344, Judgment Final Written Decision Determining All Challenged Claims Unpatentable entered Oct. 14, 2022, 41 pages.
Trend Micro Inc. v. CUPP Computing AS, IPR2021-01236, U.S. Pat. No. 10,951,632, Judgment Final Written Decision Determining All Challenged Claims Unpatentable entered Jan. 17, 2023, 49 pages.
Trend Micro Inc. v. CUPP Computing AS, IPR2021-01237, U.S. Pat. No. 10,951,632, Judgment Final Written Decision Determining All Challenged Claims Unpatentable entered Jan. 17, 2023, 30 pages.
Inter Partes Review Certificate, U.S. Pat. No. 9,781,164 K1, issued May 12, 2023, 2 pages.
Inter Partes Review Certificate, U.S. Pat. No. 8,631,488 K1, issued Jun. 21, 2023, 2 pages.
Inter Partes Review Certificate, U.S. Pat. No. 9,106,683 K1, issued Jun. 21, 2023, 2 pages.
Inter Partes Review Certificate, U.S. Pat. No. 9,843,595 K1, issued Jun. 21, 2023, 2 pages.
Inter Partes Review Certificate, U.S. Pat. No. 8,365,272 K1, issued Jul. 5, 2023, 2 pages.
Inter Partes Review Certificate, U.S. Pat. No. 9,756,079 K1, issued Jul. 7, 2023, 2 pages.

* cited by examiner

TRANSACTION SECURITY SYSTEMS AND METHODS

CROSS REFERENCE TO RELATED APPLICATIONS

The present application is a continuation of U.S. patent application Ser. No. 17/158,870, filed Jan. 26, 2021 and entitled "Transaction Security Systems and Methods," now U.S. Pat. No. 11,757,885, which is a continuation of U.S. patent application Ser. No. 16/551,200, filed Aug. 26, 2019 and entitled "Transaction Security Systems and Methods," now U.S. Pat. No. 10,904,254, which is a continuation of U.S. patent application Ser. No. 15/924,108, filed Mar. 16, 2018 and entitled "Transaction Security Systems and Methods," now U.S. Patent No. 10/397,227, which is a continuation of U.S. patent application Ser. No. 14/050,279, filed Oct. 9, 2013 and entitled "Transaction Security Systems and Methods," now U.S. Pat. No. 9,973,501, which claims priority to U.S. Provisional Patent Application Ser. No. 61/711,666, filed Oct. 9, 2012 and entitled "Transaction Security Systems and Methods," and to U.S. Provisional Patent Application Ser. No. 61/713,449, filed Oct. 12, 2012 and entitled "Transaction Security Systems and Methods," which are hereby incorporated by reference herein.

TECHNICAL FIELD

The technical field relates to computer systems and methods. More particularly, the technical field relates to computer security systems and methods.

BACKGROUND

Computer systems have long played a role in facilitating electronic transactions. In the days of mainframe computers, for instance, a person could use a client device to connect to a central computer and transfer electronic funds and other data. More recently, personal computers and mobile devices have formed an important part of electronic commerce and electronic financial management. For example, many people use their personal computers and mobile devices to buy or sell items online, or to manage their financial accounts. Many people also use systems that collect private information online. Examples of such systems include web analytics and other analytics systems. With advances in network technologies and computer systems, the number of electronic transactions by people all across the world is likely to increase.

One item of concern with respect to electronic transactions is the management of sensitive information. When a person seeks to buy or sell an item, for example, the person may be providing sensitive information about a bank account, credit card, or other financial information. When a person performs other types of electronic transactions, the person may divulge other types of sensitive information, such as the person's social security number, address, telephone number, contact information, and other personally identifiable information. Attempts to protect sensitive information in electronic transactions have not proven to be readily importable into contexts involving personal computers or mobile devices.

SUMMARY

Outbound traffic of a host application may be received from a host device having a host processor. The secure resource may be configured to provide a secure transaction based on the outbound network traffic. Using a second processor different than the host processor, it may be determined whether the host application is authorized to provide the outbound network traffic to the secure resource. The outbound network traffic may be allowed to be forwarded to the secure resource if the host application is authorized. The outbound network traffic may be disallowed to be forwarded to the secure resource if the host application is not authorized.

In some embodiments, the host application may provide the outbound network traffic to the secure resource. The disallowing the outbound network traffic may comprise blocking network access of the outbound network traffic. The disallowing the outbound network traffic may comprise modifying or filtering the outbound network traffic.

In various embodiments, the host application may comprise an application on the host device, on a server providing services to the host device, or on a device distinct from a secure transaction device comprising the second processor.

In some embodiments, the outgoing network traffic may be redirected to the second processor before determining whether the host application is authorized to provide the outbound network traffic to the secure resource. A network connection of a secure transaction device comprising the second processor, the configuring before receiving the outbound traffic of the host application.

In various embodiments, all incoming network traffic for the host device may be received. The determining whether the host application is authorized to provide the outbound network traffic may comprise looking up permissions of the host application on a security policy. In some embodiments, the second processor may be used to manage security services for the host device, the managing based on the security policy.

A secure transaction device may comprise: a host device interface module configured to receive, from a host device having a host processor, outbound network traffic of a host application, the outbound network traffic directed to a secure resource, the secure resource configured to provide a secure transaction based on the outbound network traffic; an application determination module configured to determine, using a second processor different than the host processor, whether the host application is authorized to provide the outbound network traffic to the secure resource; a trusted application module configured to allow the outbound network traffic to be forwarded to the secure resource if the host application is authorized; and an untrusted application module configured to disallow the outbound network traffic to be forwarded to the secure resource if the host application is not authorized.

The host application may provide the outbound network traffic to the secure resource. The disallowing the outbound network traffic may comprise blocking network access of the outbound network traffic. The disallowing the outbound network traffic may comprise modifying or filtering the outbound network traffic.

The host application may comprise an application on the host device, on a server providing services to the host device, or on a device distinct from the secure transaction device.

The secure transaction device may comprise a data redirection module configured to redirecting the outgoing network traffic to the second processor before the application determination module determines whether the host application is authorized to provide the outbound network traffic to the secure resource.

The secure transaction device may further comprise a device configuration module adapted to configure a network connection of the secure transaction device, before receiving the outbound traffic of the host application. The secure transaction device may further comprise a data redirection module configured to receive all incoming network traffic for the host device. In some embodiments, the application determination module may provide the outbound network traffic comprises looking up permissions of the host application on a security policy.

A system may comprise: means for receiving, from a host device having a host processor, outbound network traffic of a host application, the outbound network traffic directed to a secure resource, the secure resource configured to provide a secure transaction based on the outbound network traffic; means for determining, using a second processor different than the host processor, whether the host application is authorized to provide the outbound network traffic to the secure resource; means for allowing the outbound network traffic to be forwarded to the secure resource if the host application is authorized; and means for disallowing the outbound network traffic to be forwarded to the secure resource if the host application is not authorized.

Other features and embodiments are apparent from the accompanying drawings and from the following detailed description.

DETAILED DESCRIPTION

Figure 1:
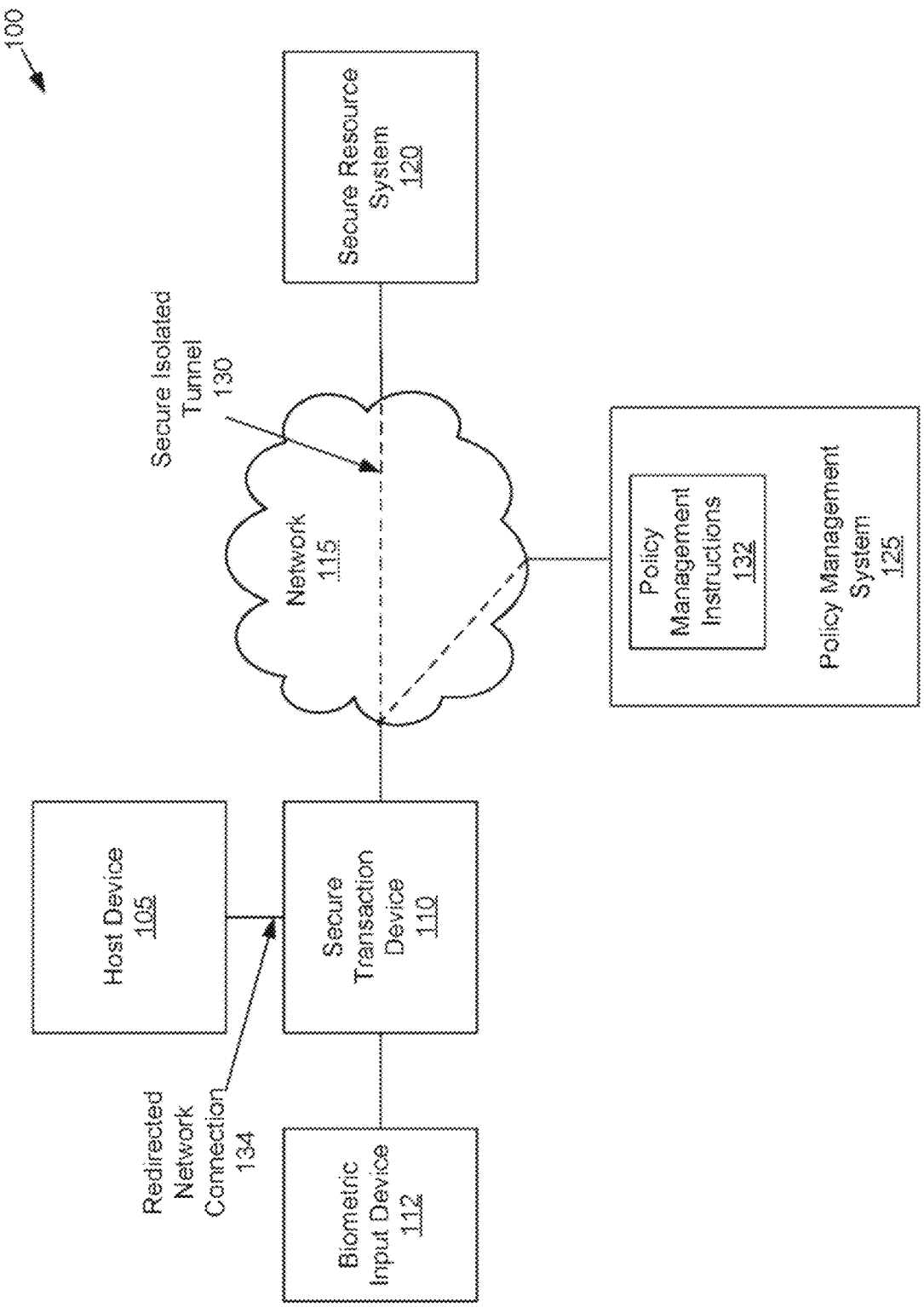
FIG. 1 shows an example of a secure transaction environment, according to some embodiments.

As discussed herein, a secure transaction device protects sensitive information from malware and untrusted applications during an electronic transaction. FIG. 1 shows an example of a secure transaction environment 100, according to some embodiments. The secure transaction environment 100 may include a host device 105, a secure transaction device 110, a network 115, a secure resource system 120, a policy management system 125, and a biometric input device 112.

The host device 105 may be coupled to the secure transaction device 110. The host device 105 may comprise a digital device configured to perform an electronic transaction. An electronic transaction, as used herein, includes a transaction performed by a digital device over a network connection. A digital device, as used herein, includes a device having a shared or dedicated processor and memory configured to store instructions executed by the shared or dedicated processor. The host device may have some or all of the elements of the digital device 1000 shown in FIG. 10. The host device may comprise one or more of a desktop computer, a laptop computer, a game console, a tablet device, a mobile phone, a personal digital assistant (PDA), or other digital device.

The host device 105 may include network interfaces, networked applications, and/or networked services. Network interfaces may include hardware and/or software adapted to connect the host device 105 to the network 115. Examples of network interfaces include wired network interfaces (such as T1 interfaces, Ethernet interfaces, etc.) as well as wireless network interfaces (such as Wi-Fi interfaces, Third Generation (3G) wireless interfaces, Fourth Generation (4G) wireless interfaces, Bluetooth interfaces, Near Field Communications (NFC) interfaces, etc.). In a specific implementation, the network interfaces of the host device 105 may serve to couple the host device 105 to the secure transaction device 110. Networked applications and/or networked services may provide the host device 105 with access to the network 115 through the network interfaces. Examples of networked applications include web browsing applications and native mobile applications. Examples of networked services include processes that access remote resources without executing in a standalone application.

Depending on whether the host device 105 is coupled to the secure transaction device 110, the host device 105 may or may not use the network interfaces of the host device 105 for network access. For instance, the networked applications and/or networked services may use the network interfaces for access to the network 115 when the host device 105 is not coupled to the secure transaction device 110. However, when the host device 105 is coupled to the secure transaction device 110, the networked applications and/or networked services may use the secure transaction device 110 for access to the network 115.

The secure transaction device 110 may be coupled to the host device 105, the biometric input device 112 and the network 115. The secure transaction device 110 may comprise a digital device having a shared or dedicated processor and memory configured to store instructions executed by the shared or dedicated processor. The shared or dedicated processor of the host device 105 may be distinct from the shared or dedicated processor of the host device 105. The secure transaction device 110 may comprise one or more of a flash memory device, a Universal Serial Bus (USB) device, and other portable device. The memory of the secure transaction device 110 may comprise Random Access Memory (RAM), such as Flash RAM.

The secure transaction device 110 may comprise a host device interface, a biometric input device interface, and a network interface. The host device interface may couple the secure transaction device 110 to the host device 105. The biometric device interface may receive biometric information such as fingerprint scans or retinal scans from the biometric input device 112. The network interface may couple the secure transaction device 110 to the network 115.

Figure 2:
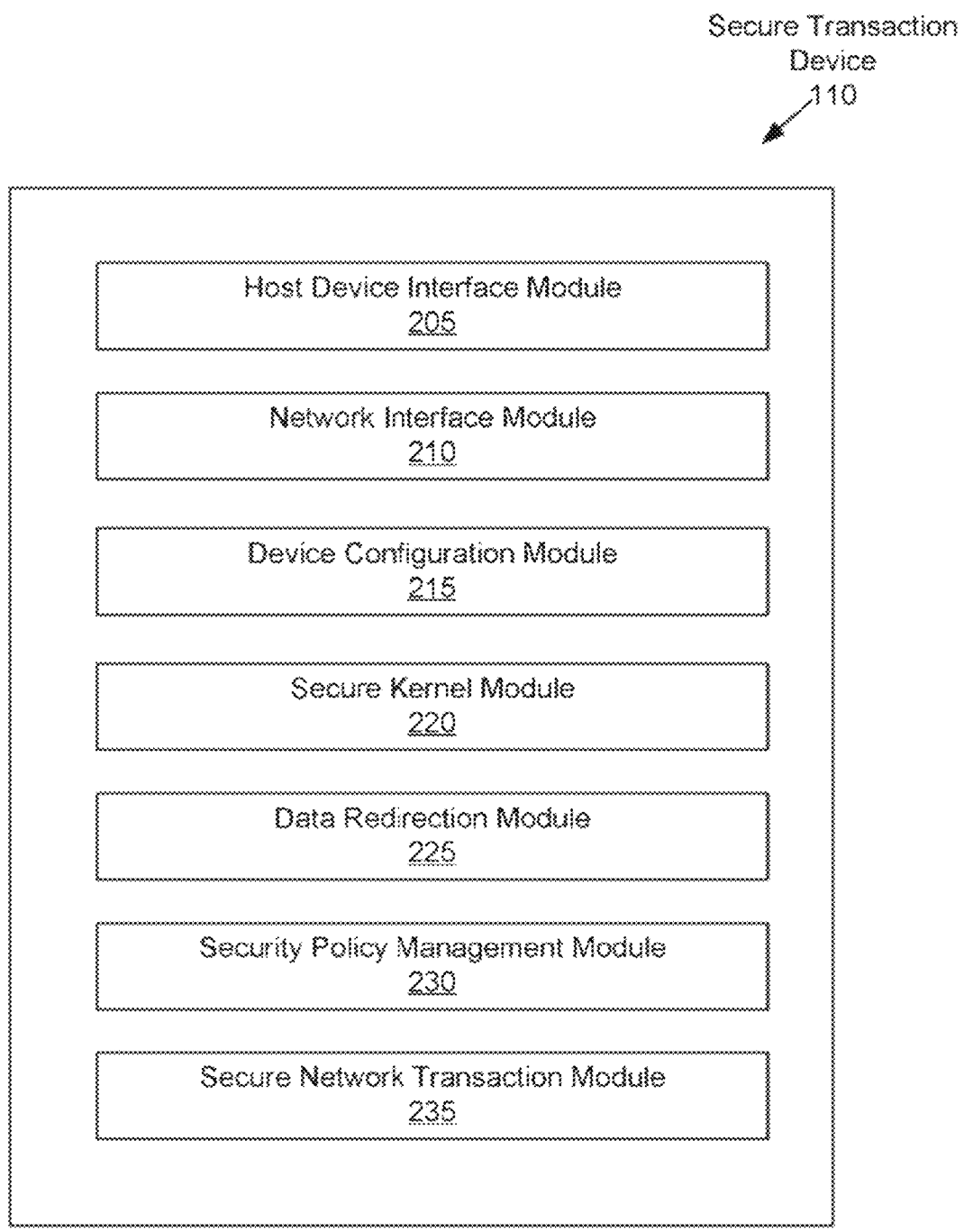
FIG. 2 shows an example of a secure transaction device, according to some embodiments.

The secure transaction device 110 may facilitate an electronic transaction between the host device 105 and the secure resource system 120. The secure transaction device 110 may instruct the operating system of the host device 105 to provide a redirected network connection 134 between the host device 105 and the secure transaction device 110. The secure transaction device 110 may also determine whether applications and/or processes on the host device 105 should be allowed to access the network 115 and/or the secure resource system 120. Trusted applications may be given access to a secure isolated tunnel 130 through the network 115. Untrusted applications and/or malware may be blocked from accessing the network 115. The secure transaction device 110 may provide security services for the host device 105. The secure transaction device 110 may maintain a secure kernel so that code within the secure transaction device 110 is not compromised by malware and/or untrusted applications on the host device 105. The user may be authenticated by authentication information, such as biometric information from the biometric input device 112. The network access and/or security services may be managed by policy management instructions 132 from the policy management system 125. FIG. 2 shows the secure transaction device 110 in greater detail.

The biometric input device 112 may be coupled to the secure transaction device 110. The biometric input device 112 may comprise a digital device. The biometric input device 112 may provide biometric information to ensure access to secure resources. The biometric input device 112 may comprise a fingerprint scanner or retinal scanner that provides a scanned image of a user's retina. In various embodiments, user may be authenticated by using authentication systems other than or in addition to the biometric input device 112 (e.g., user ID and password, secure token, etc.).

The secure resource system 120 may be coupled to the network 115. The secure resource system 120 may comprise a digital device. The secure resource system 120 may store secure resources, such as data, applications, processes, or other items that are accessed using the secure isolated tunnel 130. The secure resources may involve the use of sensitive information, such as financial information, private information, or other information that could compromise a user's security if revealed to others. The secure resources on the secure resource system 120 may require evidence of authorized access.

The policy management system 125 may be coupled to the network 115. The policy management system 125 may provide policy management instructions 132 to the secure transaction device. The policy management system 125 may also manage the secure isolated tunnel 130 through the network 115. The policy management system 125 may be implemented on a digital device, a set of cloud-based servers, or the like.

In a specific implementation, the secure transaction device 110 may allow a trusted application on the host device 105 to access secure resources on the secure resource system 120. The secure transaction device 110 may receive an indication that a trusted application on the host device 105 seeks access to the secure resources. In response to the access request, the secure transaction device 110 may instruct the operating system of the host device 105 to forward all network traffic through the secure transaction device 110. The secure transaction device 110 may further instruct the host device 105 to disable receiving and transmitting network traffic other than the network traffic through the secure transaction device 110.

In a specific implementation, the secure transaction device 110 may authenticate a user's credentials, biometric information, or other information, from the biometric input device 112 or otherwise. The secure transaction device 110 may create the secure isolated tunnel 130 for all network traffic from the trusted application on the host device 105. The secure transaction device 110 may block network access for malware and untrusted applications on the host device 105. The secure transaction device 110 may provide security services for the host device 105.

In some embodiments, the secure transaction device 110 may be implemented as a device inside the host device 105. More specifically, the secure transaction device 110 may be embedded within the host device 105. The secure transaction device 110 may include a processor that is distinct from a host processor of the host device 105. The network configuration of the secure transaction device 110 may be determined before the electronic transaction has been initiated.

In various embodiments, the secure transaction device 110 may be implemented as a device that is coupled to an external port of the host device 105. The secure transaction device 110 may include a processor that is distinct from a host processor of the host device 105. In these embodiments, the secure transaction device 110 may initiate the electronic transaction in response to the secure transaction device 110 being coupled to the host device 105. Moreover, after the electronic transaction ends, the secure transaction device 110 may be decoupled from the host device 105 so that the host device 105 can operate as normal.

FIG. 2 shows an example of a secure transaction device 110, according to some embodiments. The secure transaction device 110 may include a host device interface module 205, a network interface module 210, a device configuration module 215, a secure kernel module 220, a data redirection module 225, a security policy management module 230, and a secure network transaction module 235.

The host device interface module 205 may facilitate coupling the secure transaction device 110 to the host device 105. The host device interface module 205 may also facilitate data transfer between the host device 105 and the modules of the secure transaction device 110. The host device interface module 205 may be compatible with the network interfaces of the host device 105. More specifically, in some embodiments, the host device interface module 205 may be configured to couple to a network access port of the host device 105. The network port may comprise a wired network port or a wireless network port, in various embodiments. As an example, the network port may comprise a 4G, 3G, or NFC port of the host device 105. The host device interface module 205 may be configured to couple to a data port of the host device 105. The host device interface module 205 may be compatible with a data port of the host device 105. For instance, the host device interface module 205 may be configured to couple to a Universal Serial Bus (USB) or other data port of the host device 105.

The network interface module 210 may facilitate coupling the secure transaction device 110 to the network 115. The network interface module 210 may also facilitate data transfer between the network 115 and the modules of the secure transaction device 110. The network interface module 210 may be compatible with the network interfaces provided by the network 115. The network interface module 210 may be adapted to couple to a network port of the network 115. The network port may comprise a wired network port or a wireless network port, in various embodiments.

Figure 4:
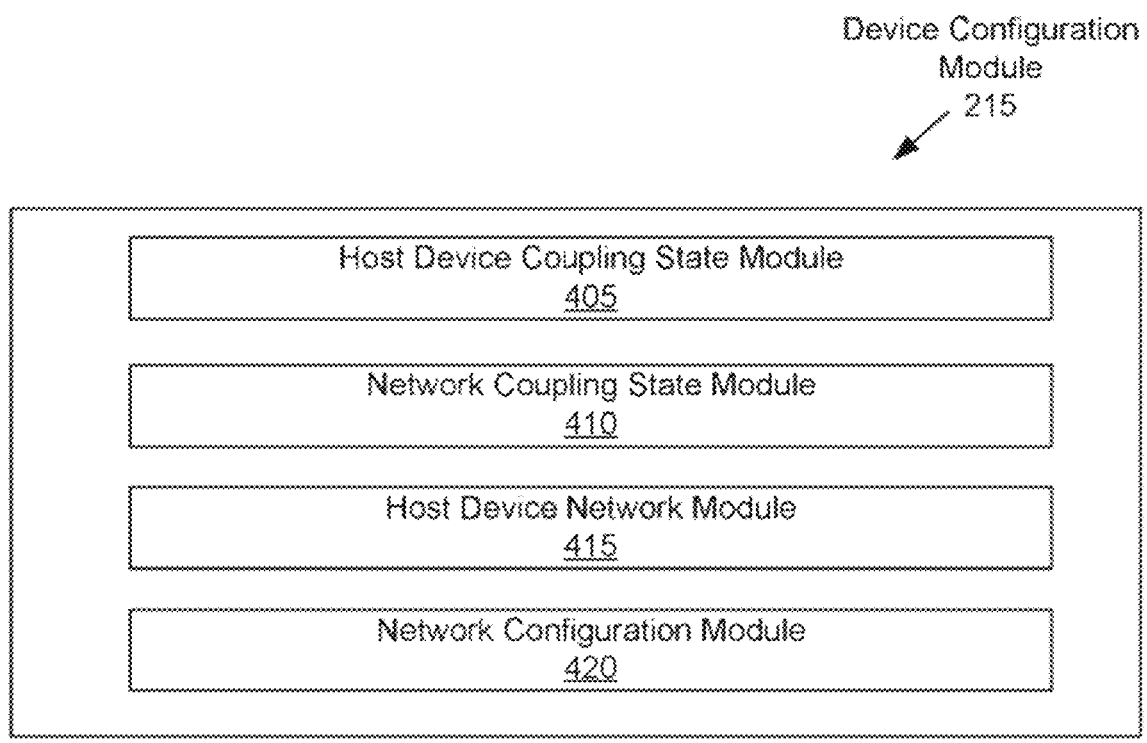
FIG. 4 shows an example of a device configuration module, according to some embodiments.

The device configuration module 215 may be coupled to the host device interface module 205 and the network interface module 210. The device configuration module 215 may establish redirection protocols to the operating system, the applications, and the services of the host device 105. The device configuration module 215 may instruct the operating system of the host device 105 to redirect all network traffic to the network 115 through the secure transaction device 110. The device configuration module 215 may also instruct the operating system of the host device 105 to disable network receivers so that all network traffic passes through the secure transaction device 110 before going to the host device 105. The device configuration module 215 may also configure the secure transaction device 110 to connect to the network 115. FIG. 4 shows the device configuration module 215 in greater detail. In some embodiments, the host device 105 may be preconfigured to redirect all network traffic to the host device interface module 205.

The secure kernel module 220 may maintain a secure kernel for the secure transaction device 110. A secure kernel, as used herein, may include data that is secure from access by applications and/or processes of the host device 105. The secure kernel module 220 may include at least a portion of the operating system of the secure transaction device 110. The secure kernel module 220 may include secure data that is inaccessible to malware and/or untrusted applications on the host device 105 and/or the biometric input device 112. As a result, the secure kernel module 220 may maintain the integrity of data therein despite access attempts by malicious code and/or untrusted applications on the host device 105. The secure kernel module 220 may be managed by the security policy that is applied to the secure transaction device 110.

The data redirection module 225 may implement the redirection protocols established by the device configuration module 215. The data redirection module 225 may monitor network traffic between the host device 105 and the network 115. More specifically, the data redirection module 225 may intercept outgoing network traffic from the host device 105 and may provide the outgoing network traffic to the network 115. The data redirection module 225 may also receive from the network 115 all incoming network traffic destined to the host device 105. The data redirection module 225 may provide the incoming network traffic to the host device 105.

Figure 6:
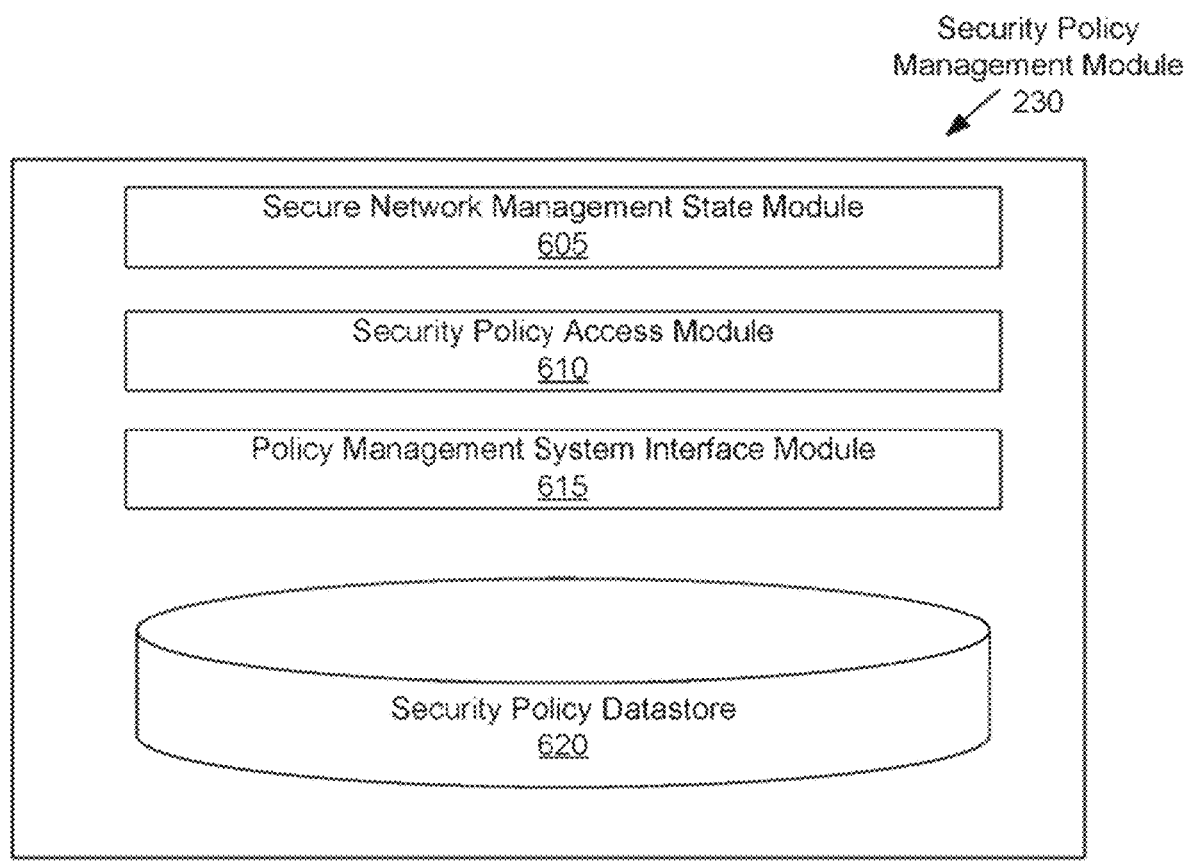
FIG. 6 shows an example of a security policy management module, according to some embodiments.

The security policy management module 230 may manage a security policy for the secure transaction device 110. To this end, the security policy management module 230 may receive the policy management instructions 132 from the policy management system 125. The security policy management module 230 may also implement the security policy based on the policy management instructions 132. The security policy management module 230 may store a copy of the security policy locally. FIG. 6 shows the security policy management module 230 in greater detail.

Figure 8:
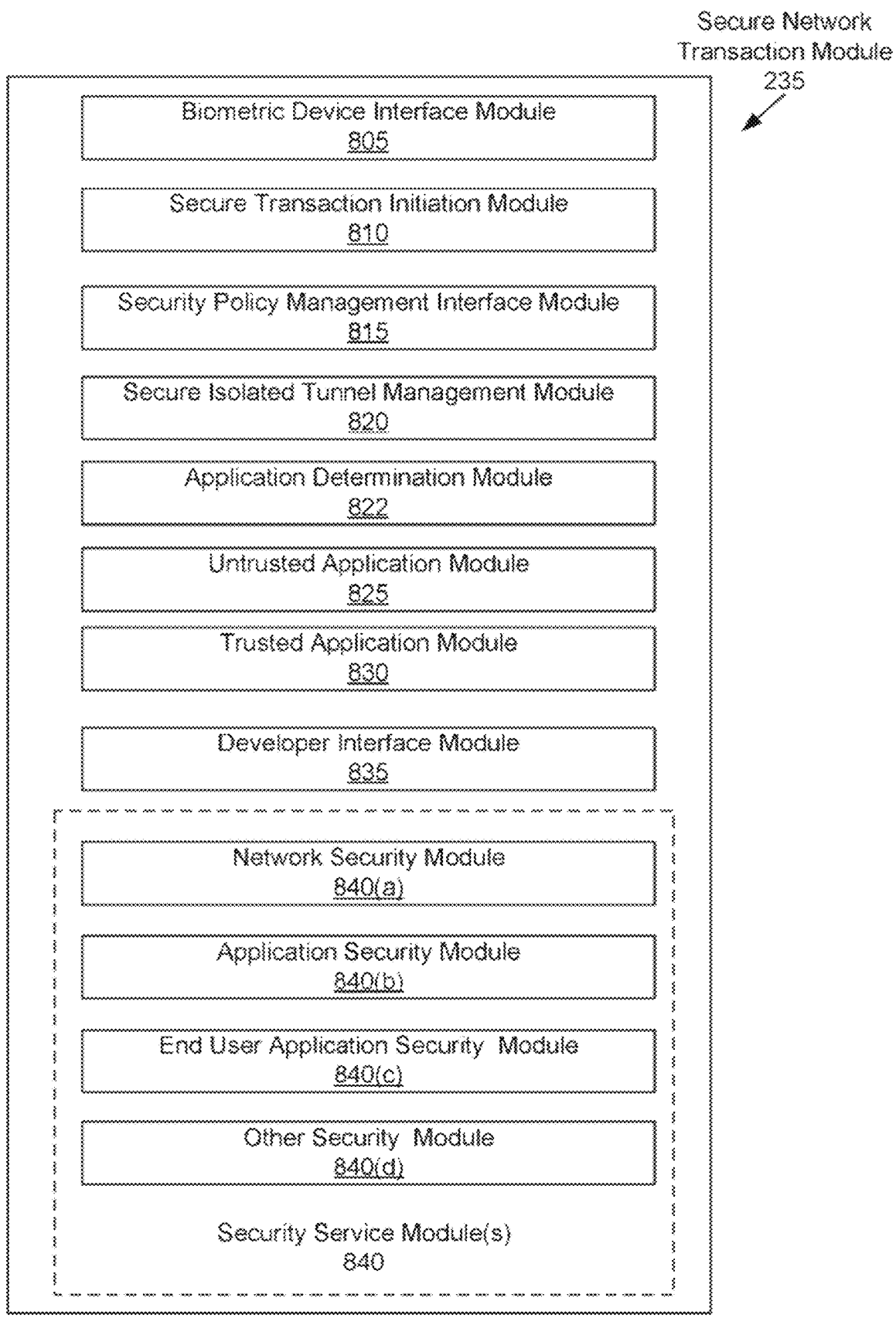
FIG. 8 shows an example of a secure network transaction module, according to some embodiments.

The secure network transaction module 235 may provide security for the electronic transaction between the host device 105 and the secure resource system 120. The secure network transaction module 235 may include protocols to manage the secure isolated tunnel 130. The secure network transaction module 235 may also include protocols to provide trusted applications with access to the secure isolated tunnel 130. The secure network transaction module 235 may block access of malware and/or untrusted applications to the secure isolated tunnel 130. In a specific implementation, the secure network transaction module 235 may request and evaluate biometric information from the biometric input device 112 to authenticate the user and authorize the electronic transaction. FIG. 8 shows the secure network transaction module 235 in greater detail.

Figure 3:
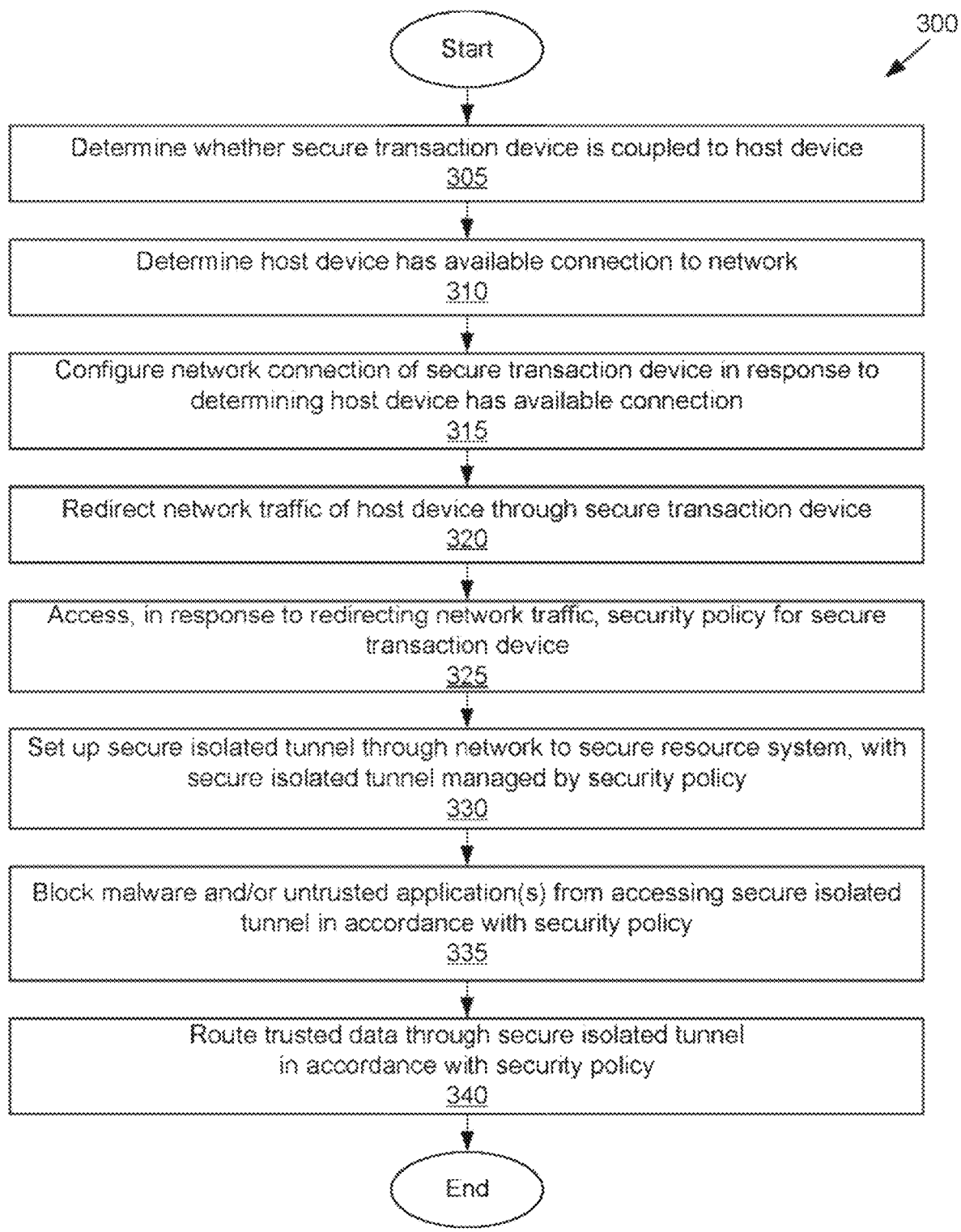
FIG. 3 shows an example of a flowchart of a method for managing a secure transaction for a host device, according to some embodiments.

FIG. 3 shows an example of a flowchart of a method 300 for managing a secure transaction for the host device 105, according to some embodiments. The method 300 is discussed in conjunction with the secure transaction device 110, shown in FIG. 2.

At block 305, the host device interface module 205 may determine whether the secure transaction device 110 is coupled to the host device 105. In embodiments where the host device interface module 205 implements a physical interface, the host device interface module 205 may determine that the secure transaction device 110 is physically coupled to the host device 105. In embodiments where the host device interface module 205 implements a network interface between the secure transaction device 110 and the host device 105, the host device interface module 205 may receive data from the host device 105 that indicates the transaction device 110 is coupled to the host device 105. The host device interface module 205 may provide to the device configuration module 215 the fact that the secure transaction device 110 is coupled to the host device 105.

At block 310, the network interface module 210 may determine that the host device 105 has an available connection to the network 115. In a specific implementation, the network interface module 210 may receive network traffic from the network 115. The network traffic may be destined for the host device 105. The network interface module 210 may inform the device configuration module 215 that network traffic is being received by the host device 105.

Figure 5:
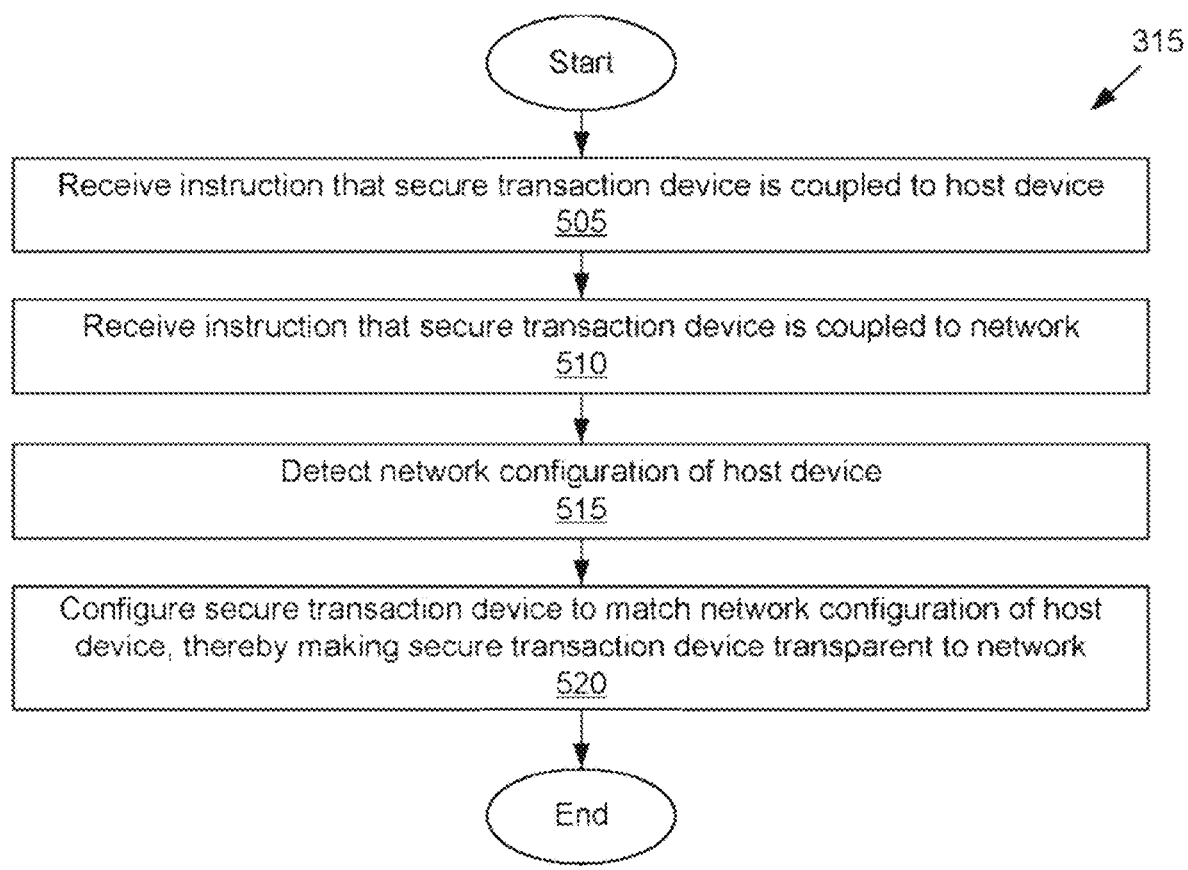
FIG. 5 shows an example of a flowchart of a method for configuring a secure transaction device, according to some embodiments.

At block 315, the device configuration module 215 may configure a network connection of the secure transaction device 110 in response to the determining the host device 105 has the available connection. In a specific implementation, the device configuration module 215 may configure a network connection of the secure transaction device 110 so that the secure transaction device 110 may receive traffic from the network 115. The device configuration module 215 may select a network configuration that virtualizes the network connection of the host device 105 and makes the secure transaction device 110 transparent to the network 115. That is, in various embodiments, the device configuration module 215 may configure the network connection of the secure transaction device 110 to appear as if the host device 105 were coupled to the network 115. FIG. 5 shows block 315 in greater detail.

At block 320, the data redirection module 225 may redirect the network traffic from the host device 105 through the secure transaction device 110. In a specific implementation, the data redirection module 225 may override the system-level processes of the host device 105 that relate to network traffic. More specifically, the data redirection module 225 may intercept all outgoing network traffic from the host device 105 and force the outgoing network traffic through the secure transaction device 110. Conversely, the data redirection module 225 may disable network traffic receivers on the host device 105 so that all incoming network traffic to the host device 105 passes through the secure transaction device 110.

At block 325, the security policy management module 230 may access, in response to the redirecting of the network traffic, the security policy on the secure transaction device 110. In an implementation, the security policy management module 230 may retrieve a stored security policy or may obtain a copy of a remote security policy stored on the policy management system 125. The security policy management module 230 may also obtain instructions to manage the security policy, as discussed in more detail herein.

At block 330, the secure network transaction module 235 may set up the secure isolated tunnel 130 through the network 115 to the secure resource system 120. The secure isolated tunnel may be managed by the security policy. In a specific implementation, the secure network transaction module 235 may establish mutual authentication protocols between the secure transaction device 110 and the secure resource system 120 so that data may be securely transferred between the secure transaction device 110 and the secure resource system 120. Such mutual authentication protocols may involve negotiation of cryptographic keys used to encrypt the data being transferred between the secure transaction device 110 and the secure resource system 120. The secure network transaction module 235 may set up the secure isolated tunnel 130 based on the security policies of the secure transaction device 110. Once the cryptographic keys are negotiated, the secure network transaction module 235 may instruct all network traffic from the secure transaction device 110 to be directed through the secure isolated tunnel 130 that has been established to the secure resource system 120.

At block 335, the secure network transaction module 235 may block malware and/or untrusted application(s) from accessing the secure isolated tunnel 130 in accordance with the security policy. In some implementations, secure network transaction module 235 may deny malware and/or untrusted applications from having access to the cryptographic keys used to transport data through the secure isolated tunnel 130. As a result, malware and/or untrusted applications may not have access to the network 115 when the secure transaction device 110 is coupled to the host device 105.

At block 340, the secure network transaction module 235 may route trusted data through the secure isolated tunnel 130 in accordance with the security policy. In various implementations, secure network transaction module 235 may provide the trusted data with the cryptographic keys used to transport data through the secure isolated tunnel 130. The secure network transaction module 235 may encapsulate the trusted data in a format that is compatible with transport over the secure isolated tunnel 130. The trusted data may be routed through the secure isolated tunnel 130 until the electronic transaction has completed.

FIG. 4 shows an example of a device configuration module 215 according to some embodiments. The device configuration module 215 may include a host device coupling state module 405, a network coupling state module 410, a host device network module 415, and a network configuration module 420.

The host device coupling state module 405 may be coupled to the host device interface module 205 (shown in FIG. 2). The host device coupling state module 405 may determine whether the host device 105 is coupled to the secure transaction device 110 based on information from the host device interface module 205. The host device coupling state module 405 may provide to the other modules of the device configuration module 215 whether the host device 105 is coupled to the secure transaction device 110.

The network coupling state module 410 may be coupled to the network interface module 210 (shown in FIG. 2). The network coupling state module 410 may determine whether the secure transaction device 110 is coupled to the network 115 based on information from the network interface module 210. The network coupling state module 410 may provide to the other modules of the device configuration module 215 whether the secure transaction device 110 is coupled to the network 115.

The host device network module 415 may be coupled to the host device interface module 205. The host device network module 415 may instruct the host device interface module 205 to request from the host device 105 network configuration details of the host device 105. More specifically, the host device network module 415 may provide a network configuration request to the host device interface module 205, which in turn may be provided to the host device 105.

The network configuration module 420 may be coupled to the network interface module 210. The network configuration module 420 may configure parameters of the network interface module 210. For instance, the network configuration module 420 may configure network-layer protocols, such as Internet Protocol (IP) and other network location protocols of the network interface module 210. The network configuration module 420 may also configure device identifiers, such as a Media Access Card (MAC) address, of the network interface module 210 so that the device identifies appear to correspond to the host device 105. That is, in various embodiments, the network configuration module 420 may configure the network interface module 210 to virtualize the network connection of the host device 105 with respect to the network 115.

FIG. 5 shows an example of a flowchart of a method for configuring the secure transaction device 110, according to some embodiments. The method is discussed in conjunction with the device configuration module 215, shown in FIG. 4.

At block 505, the host device coupling state module 405 may receive an instruction that the secure transaction device 110 is coupled to the host device 105. In a specific implementation, the host device coupling state module 405 may receive a signal from the host device interface module 205 that the secure transaction device 110 is coupled to the host device 105.

At block 510, the network coupling state module 410 may receive an instruction that the secure transaction device 110 is coupled to the network 115. In a particular implementation, the network coupling state module 410 may receive a signal from the network interface module 210 that the secure transaction device 110 is coupled to the network 115.

At block 515, the host device network module 415 may obtain network configuration details of the host device 105. In various implementations, the host device network module 415 may request the host device 105 to provide its configuration details with respect to the network 115. The host device 105 may provide, in response to the request, its network configuration, including its IP address, network location, and other network-layer protocols. The host device 105 may also provide device identifiers of the host device 105.

At block 520, the network configuration module 420 may configure the secure transaction device 110 to match the network configuration details of the host device 105. In an implementation, the network configuration module 420 may match protocols, such as network-layer and device-layer protocols, of the secure transaction device 110 to corresponding protocols of the host device 105. Accordingly, in some embodiments, the network configuration module 420 may virtualize the network connection of the host device 105 and make the secure transaction device 110 transparent to the network 115.

FIG. 6 shows an example of a security policy management module 230, according to some embodiments. The security policy management module 230 may comprise a secure network management state module 605, a security policy access module 610, a policy management system interface module 615, and a security policy datastore 620.

The secure network management state module 605 may be coupled to the secure network transaction module 235 (shown in FIG. 2). The secure network management state module 605 may be configured to receive from the secure network transaction module 235 information about a state of the secure transaction device 110. The network management state module 605 may be configured to receive from the secure network transaction module 235 information relating to whether the secure transaction device 110 is managing network services for the host device 105.

The security policy access module 610 may be coupled to the security policy datastore 620. The security policy access module 610 may provide instructions to the security policy datastore 620 to access and/or modify a particular security policy therein.

The policy management system interface module 615 may be coupled to the policy management system 125 (shown in FIG. 1) through the network 115. The policy management system interface module 615 may receive the policy management instructions 132 (shown in FIG. 1) from the policy management system 125.

The security policy datastore 620 may be coupled to the other modules of the security policy management module 230. The security policy datastore 620 may provide a particular security policy to the security policy access module 610.

Figure 7:
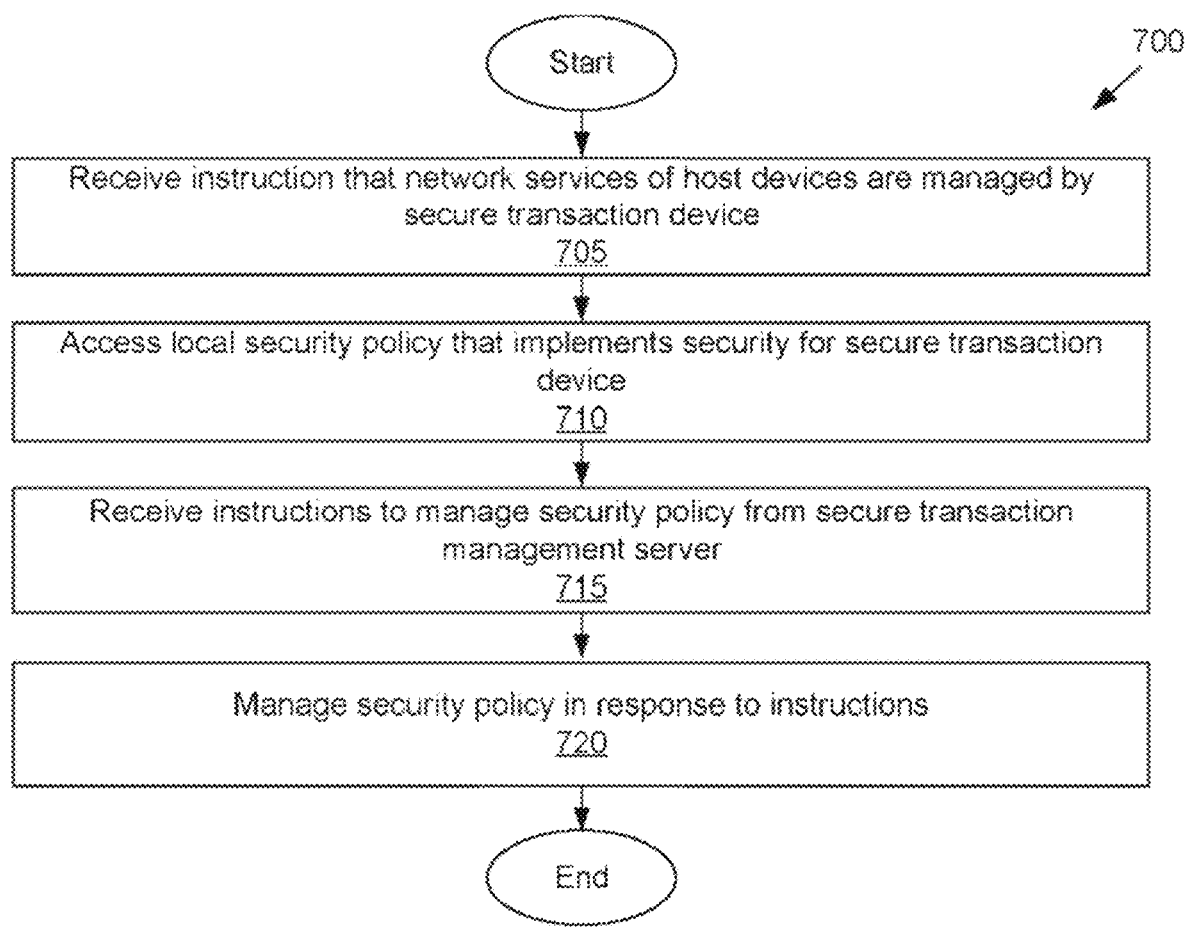
FIG. 7 shows an example of a flowchart of a method for managing a security policy of a secure transaction device, according to some embodiments.

FIG. 7 shows an example of a flowchart of a method 700 for managing a security policy of a secure transaction device, according to some embodiments. The method 700 is discussed in conjunction with the security policy management module 230, shown in FIG. 6.

At block 705, the secure network management state module 605 may receive an instruction that network services of the host device 105 are being managed by the secure transaction device 110. In a specific implementation, the secure network management state module 605 may receive an instruction from the secure network transaction module 235 that the secure transaction device 110 is managing network services for the host device 105. As discussed, managing network services may involve allowing trusted applications access to the secure isolated tunnel 130, and disallowing malware and/or untrusted applications from accessing the network 115. The secure network management state module 605 may receive from the secure network transaction module 235 a notification to this effect.

At block 710, the security policy access module 610 may access a local security policy that implements security for the secure transaction device 110. In an implementation, the security policy access module 610 may access the security policy stored in the security policy datastore 620. The security policy may be implementing the security for the secure transaction device 110.

At block 715, the policy management system interface module 615 may receive instructions to manage the security policy. In a specific implementation, the instructions may comprise remote instructions from the policy management system 125. The policy management system interface module 615 may provide the instructions to the security policy access module 610.

At block 720, the security policy access module 610 may, in response to the instructions, manage the security policy. In a particular implementation, the security policy access module 610 may provide instructions to update, modify, add to, or delete from the security policy in the security policy datastore 620.

FIG. 8 shows an example of a secure network transaction module 235, according to some embodiments. The secure network transaction module 235 may comprise a biometric device interface module 805, a secure transaction initiation module 810, a security policy management interface module 815, a secure isolated tunnel management module 820, an application determination module 822, an untrusted application module 825, a trusted application module 830, a developer interface module 835, and security service module(s) 840.

The biometric device interface module 805 may be coupled to the biometric input device 112. The biometric device interface module 805 may receive biometric information from the biometric input device 112. The biometric device interface module 805 may provide the biometric information to the other modules of the secure network transaction module 235, such as the secure transaction initiation module 810.

The secure transaction initiation module 810 may be coupled to the biometric device interface module 805 and/or the host device interface module 205. The secure transaction initiation module 810 may receive notifications regarding whether a trusted application on the host device 105 is requesting access to the secure resource system 120. The secure transaction initiation module 810 may also receive biometric information from the biometric device interface module 805. The secure transaction initiation module 810 may verify whether the biometric information should be authenticated for a user of the host device 105.

The security policy management interface module 815 may be coupled to the security policy management module 230, shown in FIG. 2. The security policy management interface module 815 may access a security policy stored in the security policy management module 230. The security policy management interface module 815 may also determine whether the security policy allows or denies access to the secure isolated tunnel 130 for applications and/or processes on the host device 105.

The secure isolated tunnel management module 820 may be coupled to the network interface module 210. The secure isolated tunnel management module 820 may manage the secure isolated tunnel 130 and related protocols. The secure isolated tunnel management module 820 may manage mutual authentication protocols between the secure transaction device 110 and the secure resource system 120 so that data may be securely transferred between the secure transaction device 110 and the secure resource system 120. The secure isolated tunnel management module 820 may manage the secure isolated tunnel 130 based on the security policies of the secure transaction device 110. The secure isolated tunnel management module 820 may direct network traffic from the secure transaction device 110 through the secure isolated tunnel 130.

The application determination module 822 may be coupled to the host device interface module 205 and to the security policy management interface module 815. The application determination module 822 may parse the network traffic to extract an application or process associated with the network traffic. The application determination module 822 may determine, based on the security policy, whether the application or process comprises an untrusted application or malware. The application determination module 822 may also determine, based on the security policy, whether the application or process comprises a trusted application. The application determination module 822 may provide the determination to the untrusted application module 825 and the trusted application module 830.

The untrusted application module 825 may be coupled to the application determination module 822. The untrusted application module 825 may obtain network traffic from the host device interface module 205. If so, the untrusted application module 825 may block network access to the application or process. The trusted application module 830 may be coupled to the application determination module 822. The trusted application module 830 may determine, based on the security policy, whether the application or process comprises a trusted application. If so, the trusted application module 830 may allow the network traffic to access the secure isolated tunnel 130.

The developer interface module 835 may be coupled to the network interface module 210. The developer interface module 835 may receive instructions to modify an interface associated with the secure transaction device 110.

The security service module(s) 840 may be coupled to the host device interface module 205 and to the security policy management interface module 815. The security service module(s) 840 may provide security services for the host device 105. The security service module(s) 840 may comprise a network security module 840(a), an application security module 840(b), an end user application security module 840(c), and another security service module 840(d). The network security module 840(a) may provide network security services for an application on the host device 105 and/or the host device 105 itself. The application security module 840(b) may provide application security services for an application on the host device 105 and/or the host device 105 itself. The end-user security module 840(c) may provide end-user application security services for an application on the host device 105 and/or the host device 105 itself. The other security service module 840(d) may provide other security services not specifically enumerated by the network security module 840(a), the application security module 840(b), and the end user application security module 840(c).

Figure 9:
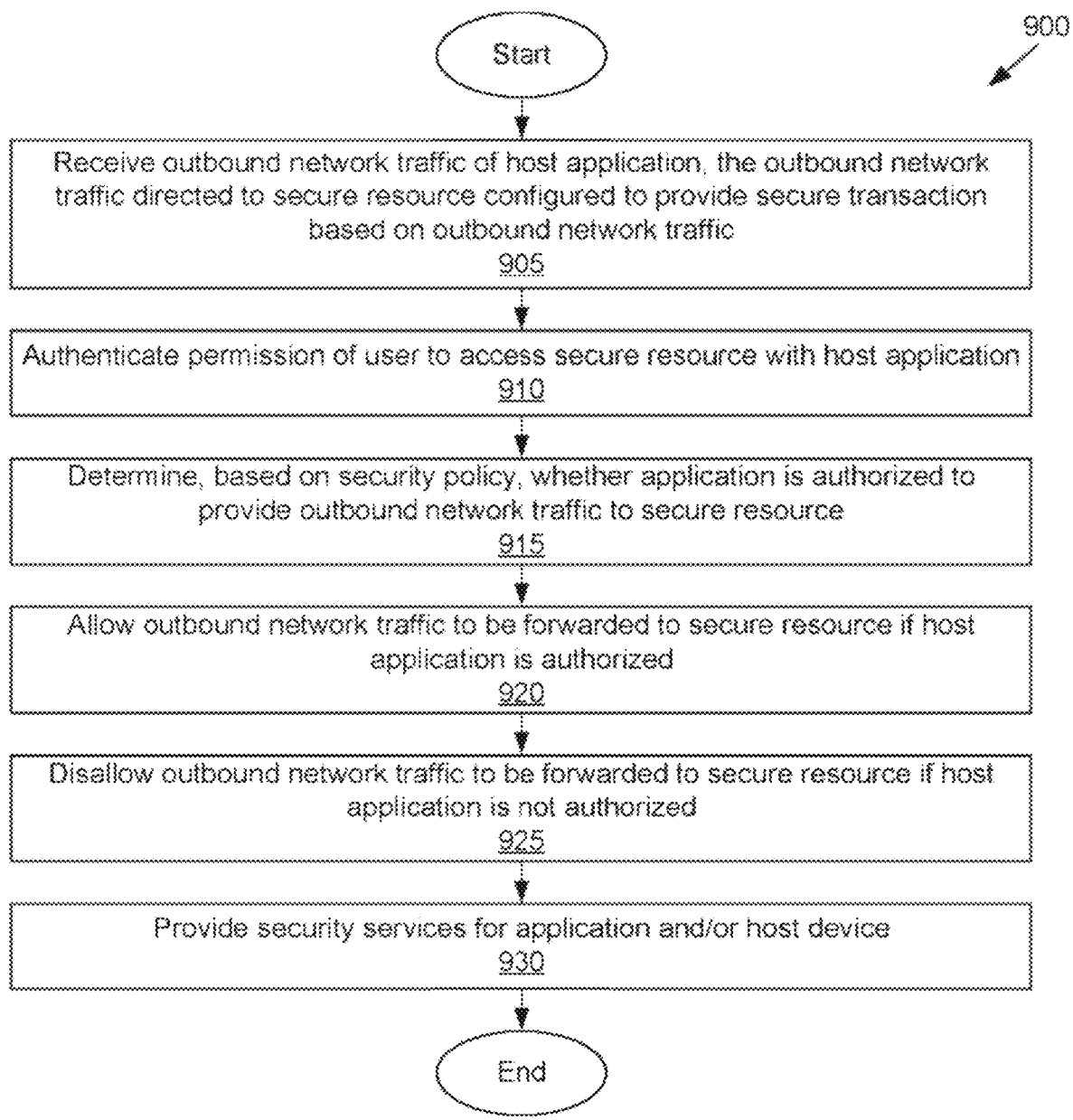
FIG. 9 shows an example of a flowchart of a method for providing a secure transaction to a host device, according to some embodiments.

FIG. 9 shows an example of a flowchart of a method 900 for providing a secure transaction to a host device, according to some embodiments. The method 900 is discussed in conjunction with the secure network transaction module 235, shown in FIG. 8.

At block 905, the secure transaction initiation module 810 may receive outbound traffic of a host application of the host device 105. The outbound network traffic may be directed to the secure resource on the secure resource system 120. The secure resource may be configured to provide a secure transaction based on the outbound network traffic. In a specific implementation, a notification may be provided when an application on the host device 105 attempts to send or receive network traffic. The operating system of the host device 105, which was hooked to redirect all network traffic to the secure transaction device 110, may provide such a notification. In some embodiments, the application itself may provide the notification.

At block 910, the secure transaction initiation module 810 may determine a permission of the user to access the secure resources with the application. In an implementation, the secure transaction initiation module 810 may evaluate whether the user has provided credentials sufficient to warrant access to the secure resources. For instance, the secure transaction initiation module 810 may determine whether the user has provided a valid username and password to access the secure resources. In some embodiments, the secure transaction initiation module 810 may perform the authentication based on biometric information from the biometric device interface module 805. For instance, the secure transaction initiation module 810 may evaluate whether a fingerprint scan or a retinal scan adequately corresponds to the user of the application. If the user is authenticated, the secure transaction initiation module 810 may inform the security policy management interface module 815.

At block 915, the application determination module 822 may determine, based on a security policy, whether the application is a trusted application, or an untrusted application or malware. In a specific implementation, the application determination module 822 may request the security policy management interface module 815 to compare the permissions of the application with permissions of known applications in the security policy datastore 620 (shown in FIG. 6). The application determination module 822 may further extract an application or process associated with the network traffic. The application determination module 822 may determine, based on the security policy, whether the application or process comprises an untrusted application or malware. The application determination module 822 may also determine, based on the security policy, whether the application or process comprises a trusted application. The application determination module 822 may provide the determination to the untrusted application module 825 and the trusted application module 830.

At block 920, the trusted application module 830 may allow the application to access the secure resource through the secure isolated tunnel 130 if the application is a trusted application. If the secure isolated tunnel has not been created, the trusted application module 830 may request the secure isolated tunnel management module 820 to create the secure isolated tunnel 130. The trusted application module 830 may format network traffic from the application into a format compatible with the secure isolated tunnel 130.

At block 925, the untrusted application module 825 may block the application's network access if the application is an untrusted application or is malware. In various implementations, the untrusted application module 825 may block forwarding of all network traffic related to the application if the application is an untrusted application or is malware. In some embodiments, the untrusted application module 825 may filter or modify all network traffic related to the application if the application is an untrusted application or is malware.

At block 930, the security service module(s) 840 may provide security services for the application and/or the host device 105. In some embodiments, the network security module 840(a) may provide network security services for the application and/or the host device 105. More specifically, the network security module 840(a) may provide one or more of a firewall, an intrusion detection system, an intrusion prevention system, a virtual private network (VPN)

client, and other network security systems. In some embodiments, the application security module 840(*b*) may provide application security services for the application and/or the host device 105. For example, the application security module 840(*b*) may provide proxies for protocols such as: Hypertext Transfer Protocol (HTTP), File Transfer Protocol (FTP), Single Mail Transfer Protocol (SMTP), and Post Office Protocol (POP). The application security module 840(*b*) may also provide anti-virus services, anti-spyware services, anti-spam services, anti-phishing services, web filtering services, and parental control services. In various embodiments, the end user application security module 840(*c*) may provide end user application security services for the application and/or the host device 105. For instance, the end-user security module 840(*c*) may provide Layer-8 security services, multi-layer security services, and other security end-user application security services for. In some embodiments, the other security module 840(*d*) may provide other security services for the application and/or the host device 105.

Figure 10:
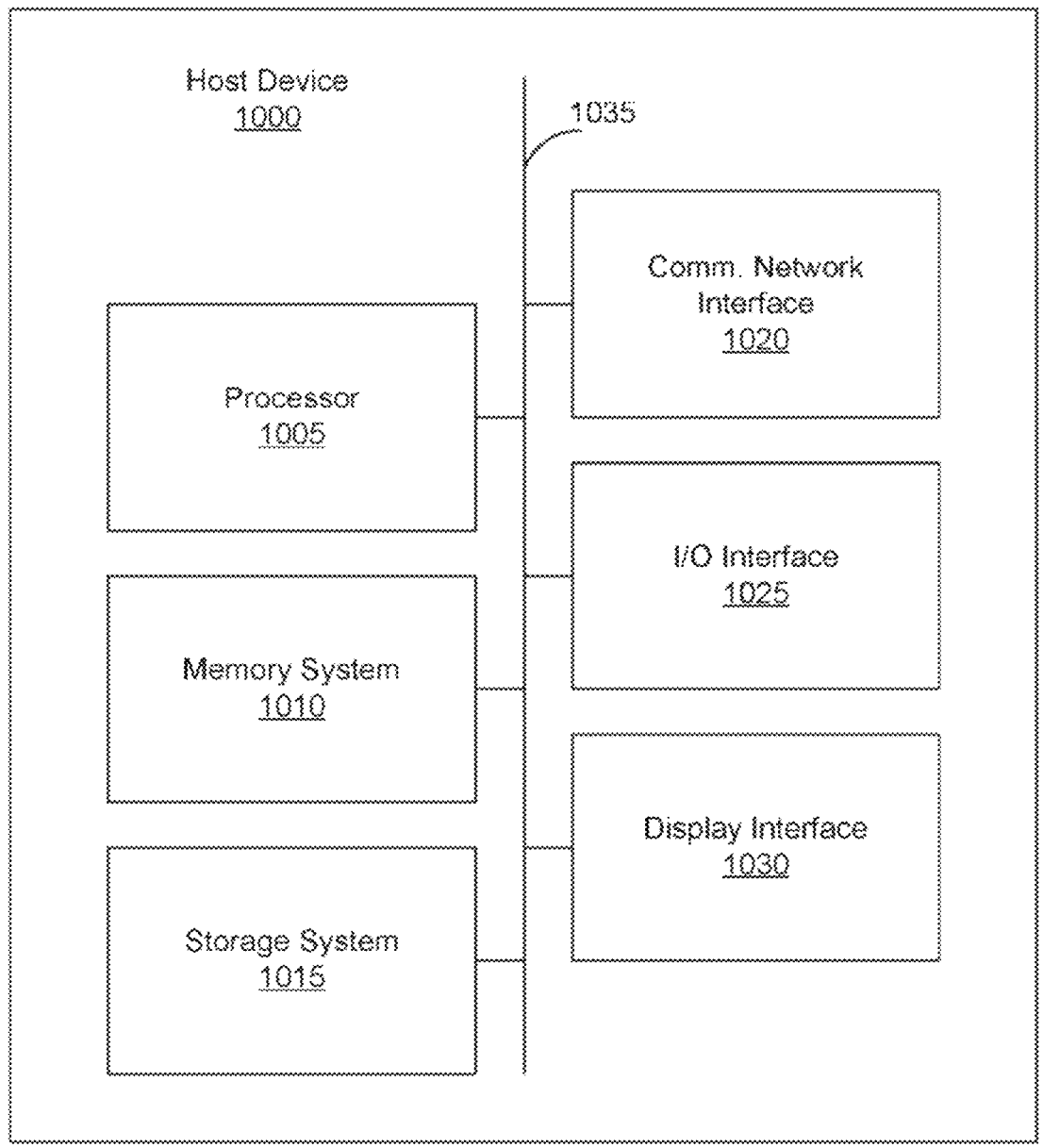
FIG. 10 shows an example of a digital device, according to some embodiments.

FIG. 10 depicts a digital device 1000, according to some embodiments. The digital device 1000 comprises a processor 1005, a memory system 1010, a storage system 1015, a communication network interface 1020, an I/O interface 1025, and a display interface 1030 communicatively coupled to a bus 1035. The processor 1005 may be configured to execute executable instructions (e.g., programs). The processor 1005 may comprises circuitry or any processor capable of processing the executable instructions.

The memory system 1010 is any memory configured to store data. Some examples of the memory system 1010 are storage devices, such as RAM or ROM. The memory system 1010 may comprise the RAM cache. In various embodiments, data is stored within the memory system 1010. The data within the memory system 1010 may be cleared or ultimately transferred to the storage system 1015.

The storage system 1015 is any storage configured to retrieve and store data. Some examples of the storage system 1015 are flash drives, hard drives, optical drives, and/or magnetic tape. In some embodiments, the digital device 1000 includes a memory system 1010 in the form of RAM and a storage system 1015 in the form of flash data. Both the memory system 1010 and the storage system 1015 comprise computer readable media which may store instructions or programs that are executable by a computer processor including the processor 1005.

The communication network interface (com. network interface) 1020 may be coupled to a data network via the link 1040. The communication network interface 1020 may support communication over an Ethernet connection, a serial connection, a parallel connection, or an ATA connection, for example. The communication network interface 1020 may also support wireless communication (e.g., 802.11 a/b/g/n, WiMAX). It will be apparent to those skilled in the art that the communication network interface 1020 may support many wired and wireless standards.

The input/output (I/O) interface 1025 is any device that receives input from the user and output data. The display interface 1030 is any device that may be configured to output graphics and data to a display. In one example, the display interface 1030 is a graphics adapter.

It will be appreciated by those skilled in the art that the hardware elements of the digital device 1000 are not limited to those depicted in FIG. 10. A digital device 1000 may comprise more or less hardware elements than those depicted. Further, hardware elements may share functionality and still be within various embodiments described herein. In one example, encoding and/or decoding may be performed by the processor 1005 and/or a co-processor located on a GPU.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Figure 11:
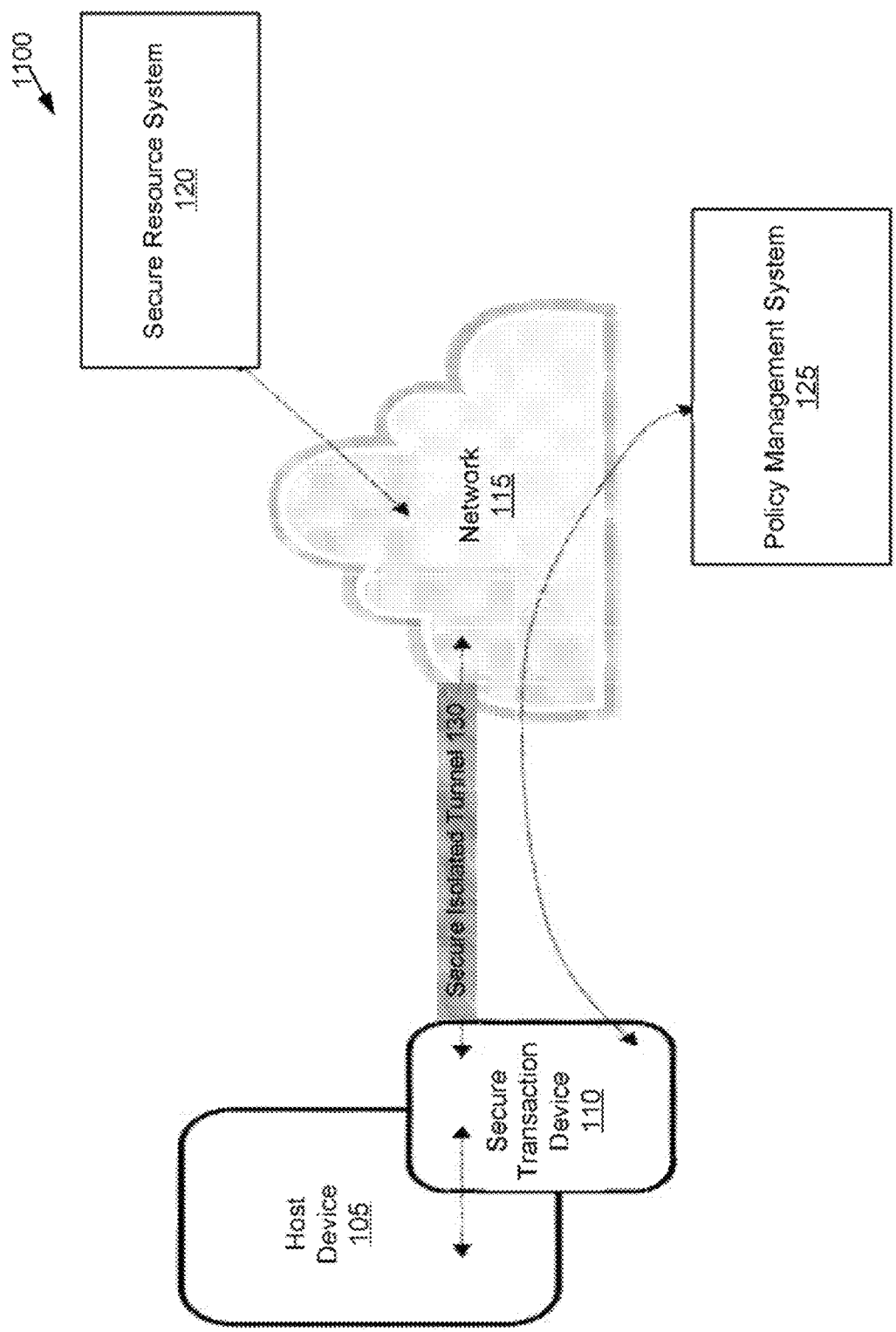
FIG. 11 shows an example of an implementation of a secure transaction environment, according to some embodiments.

FIG. 11 shows an example of an implementation of a secure transaction environment 1100, according to some embodiments. The secure transaction environment 1100 may include elements having like numbers to the elements in FIG. 1.

Figure 12:
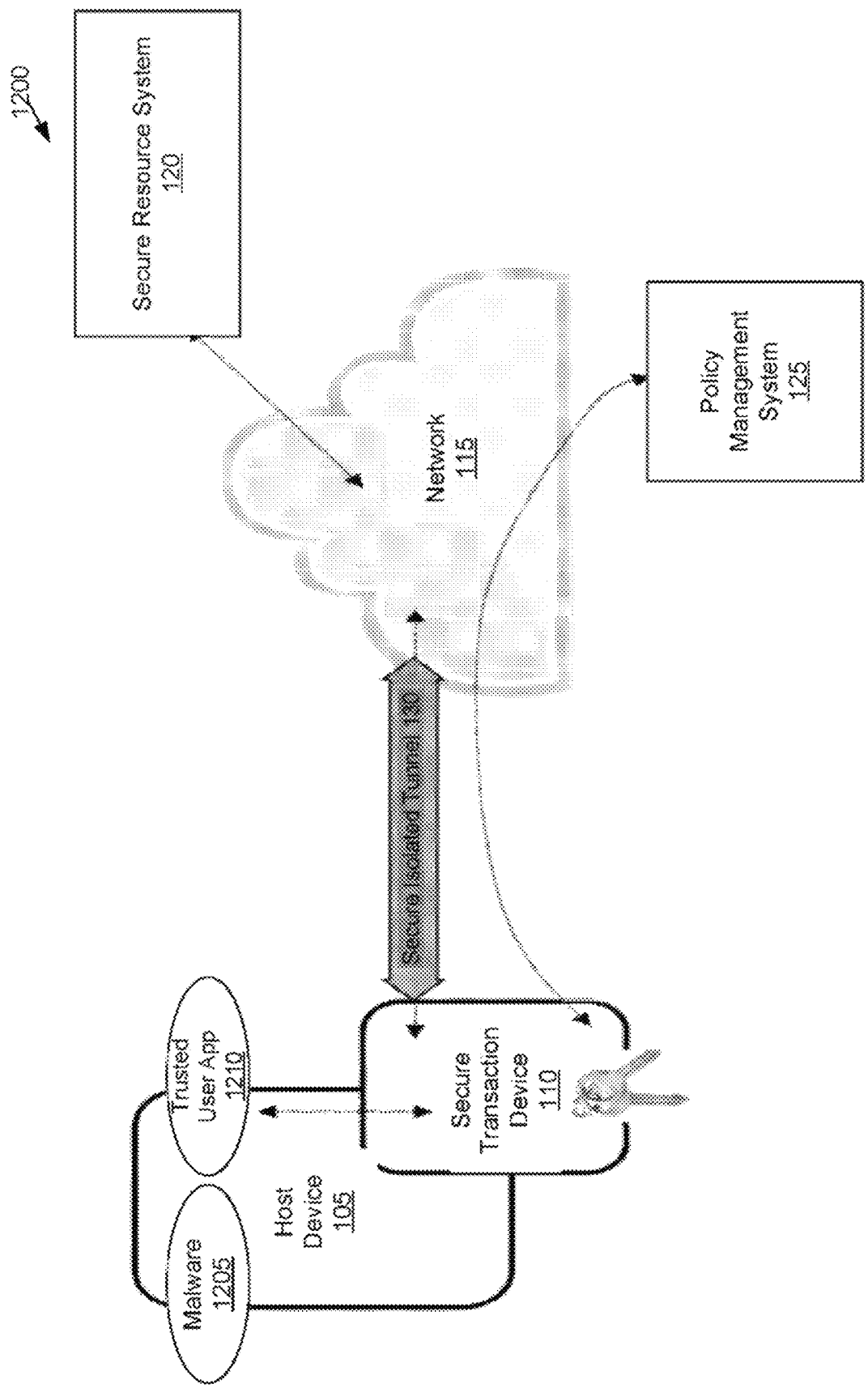
FIG. 12 shows an example of an implementation of a secure transaction environment, according to some embodiments.

FIG. 12 shows an example of an implementation of a secure transaction environment 1200, according to some embodiments. The secure transaction environment 1200 may include elements having like numbers to the elements in FIG. 1. The host device 105 may include malware 1205 and a trusted user application 1210. In a specific implementation, the secure transaction device 110 may block the malware 1205 from accessing the network 115. The secure transaction device 110 may also allow the trusted user application 1210 to access secure resources on the secure resource system 120 through the secure isolated tunnel 130.

In a specific implementation, the trusted user application 1210 may comprise components and/or processes that allow the host device 105 to perform financial transactions. As an example, the trusted user application 1210 may comprise a mobile application of a bank. The secure resources on the secure resource system 120 may include resources for a financial transaction performed by the trusted user application 1210 (e.g., a money transfer or an account management function). In this example, the secure transaction device 110 may ensure that data related to the transaction by the trusted user application 1210 passes through the secure isolated tunnel 130 in the network 115. The secure transaction device 110 may ensure that the malware 1205 does not have access to the data entered for the financial transaction. As another example, the trusted user application 1210 may comprise components and/or processes for an NFC transaction. The secure transaction device 110 may ensure that data related to NFC transaction passes through the secure isolated tunnel 130 in the network 115. The secure transaction device 110 may ensure that the malware 1205 does not have access to the data entered for the NFC transaction.

Figure 13:
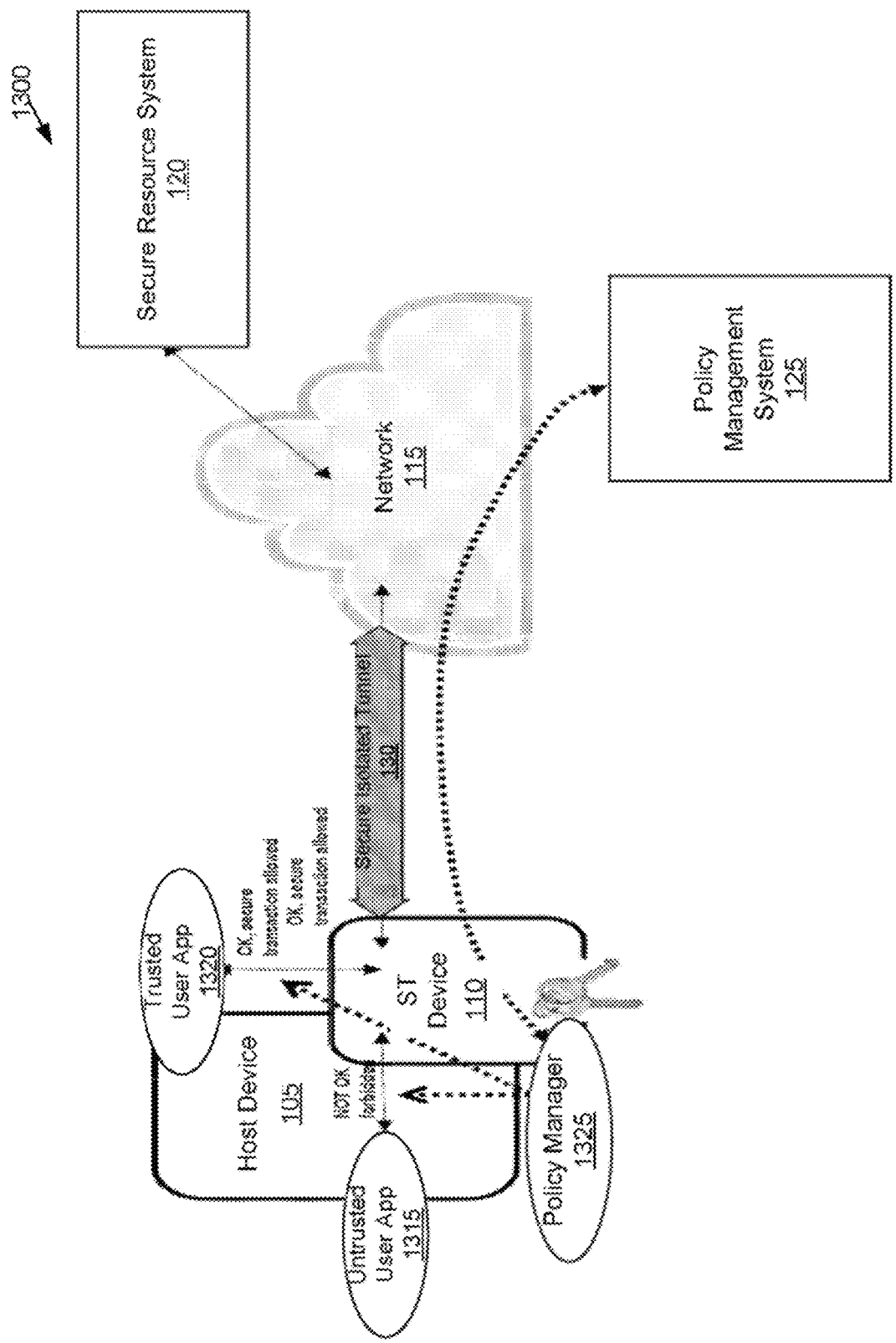
FIG. 13 shows an example of an implementation of a secure transaction environment, according to some embodiments.

FIG. 13 shows an example of an implementation of a secure transaction environment 1300, according to some embodiments. The secure transaction environment 1300 may include elements having like numbers to the elements in FIG. 1. In this example, the host device 105 may include an untrusted user application 1315 and a trusted user application 1320. The secure transaction device 110 may include a policy manager 1325, which manages security policies through the policy management system 1125.

Figure 14:
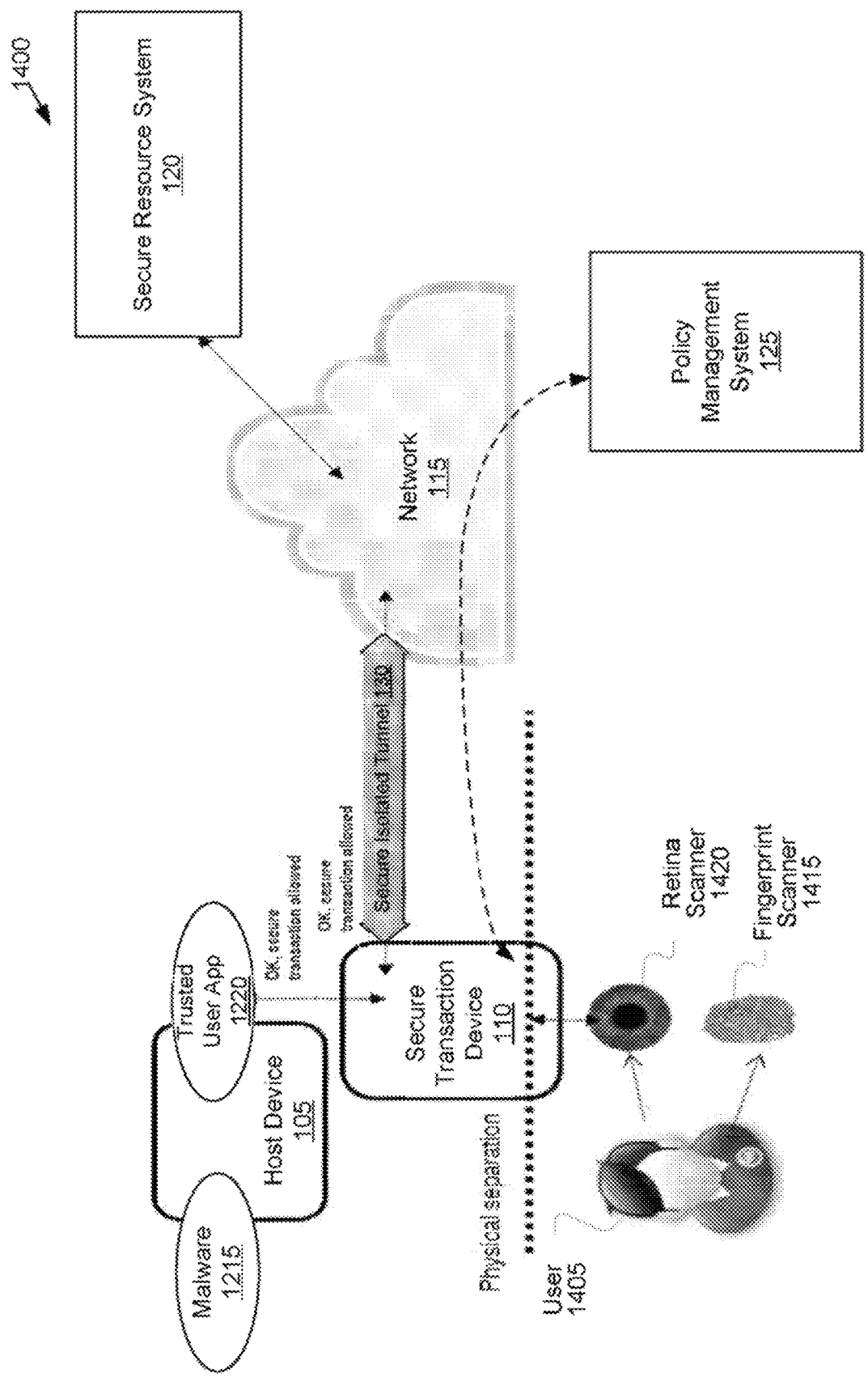
FIG. 14 shows an example of an implementation of a secure transaction environment, according to some embodiments.

FIG. 14 shows an example of an implementation of a secure transaction environment 1400, according to some embodiments. The secure transaction environment 1400 may include elements having like numbers to the elements in FIG. 1 and FIG. 12. The secure transaction environment 1400 may further include a user 1405, a retina scanner 1420, and a fingerprint scanner 1415. The user 1405 may include a human being. The user 1405 may have biometric information that uniquely identifies him or her. For instance, the user 1405 may have fingers with unique fingerprints or eyes with a unique retinal pattern. The fingerprint scanner 1415 may include a digital device configured to scan a fingerprint of the user 1405. The retina scanner 1420 may include a digital device configured to scan a retinal pattern of the user 1405.

Figure 15:
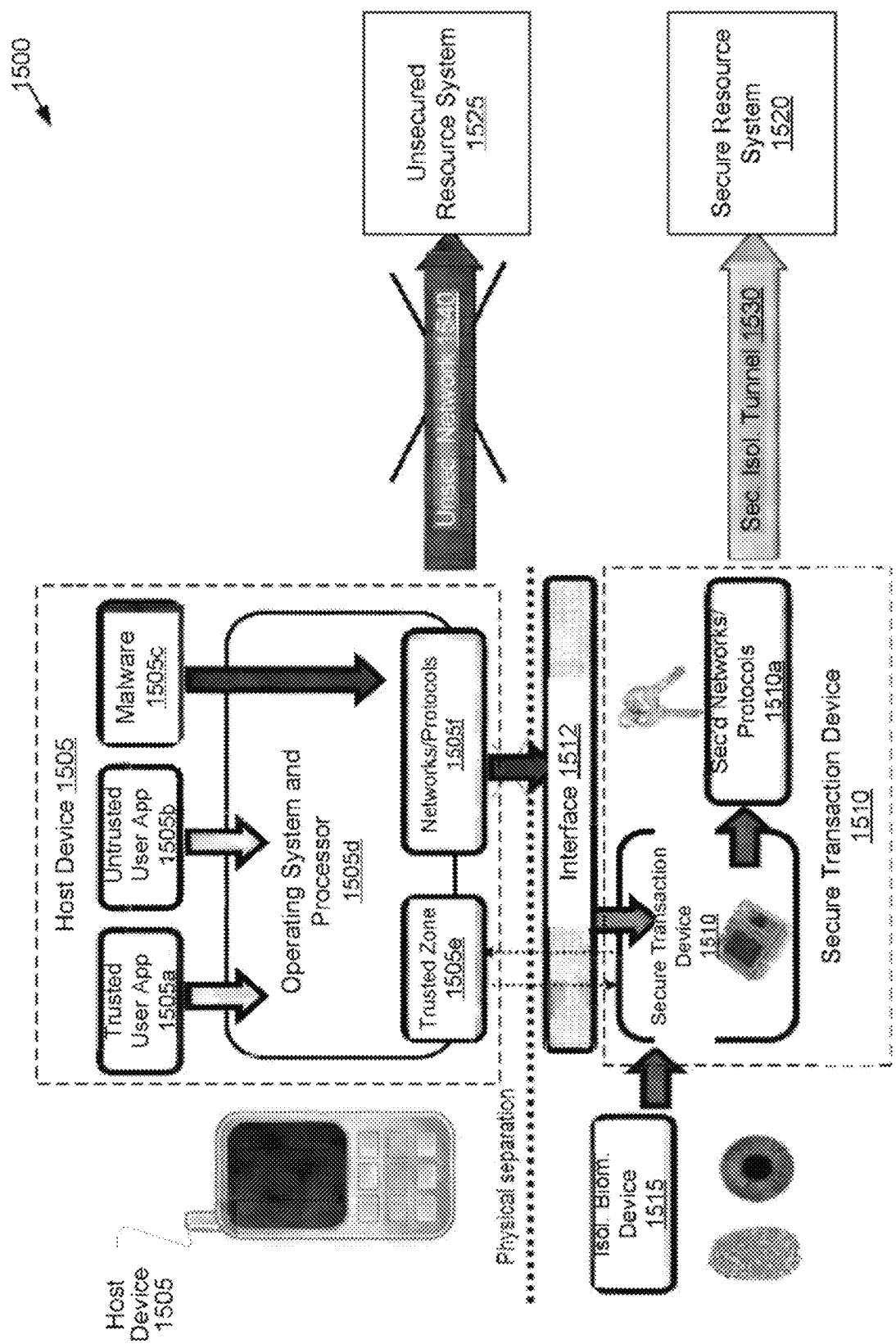
FIG. 15 shows an example of an implementation of a secure transaction environment, according to some embodiments.

FIG. 15 shows an example of an implementation of a secure transaction environment 1500, according to some embodiments. The secure transaction environment 1500 may include a host device 1505, a secure transaction device 1510, an interface 1512, an isolated biometric device 1515, a secure resource system 1520, an unsecured resource system 1525, a secure isolated tunnel 1530, and an unsecured network 1540.

The host device 1505 may provide network access for application components and/or processes. The host device 1505 may include a trusted user application 1505a, an untrusted user application 1505b, malware 1505c, an operating system and processor 1505d, a trusted zone 1505e of operation, and networks and protocols 1505f implemented by the trusted zone 1505e.

The secure transaction device 1510 may implement secure transaction services for the host device 1505. The secure transaction device 1510 may include secured networks and protocols 1510a. The interface 1512 may comprise a device interface. The interface 1512 may comprise a network interface, such as a Wi-Fi interface, a 3G interface, a 4G interface, or an NFC interface.

The isolated biometric device 1515 may receive biometric information from a user. Examples of biometric information may include fingerprint information or retinal scan information. The isolated biometric device 1515 may be coupled to the secure transaction device 1510.

The secure resource system 1520 may comprise secure resources. The secure resource system 1520 may be coupled to the secure transaction device 1510 using a network. The unsecured resource system 1525 may comprise unsecured resources. The unsecured resource system 1525 may be coupled to the host device 1505 using a network, for which access may be blocked by the secure transaction device 1510, as discussed herein.

In a specific implementation, the secure transaction device 1510 may receive biometric information from the isolated biometric device 1515. The secure transaction device 1510 may further authenticate the biometric information. After authentication, the secure transaction device 1510 may implement the secured networks and protocols 1510a therein, as well as the trusted zone 1505e (and the corresponding networks and protocols 1505f) within the host device 1505. Further, when In a specific implementation, the secure transaction device 1510 may determine whether one or more of the trusted user application 1505a, the untrusted user application 1505b, and the malware 1505c seeks network access. Such monitoring may be accomplished by instructing the operating system and processor 1505d to forward all network traffic to the secure transaction device 1510. The secure transaction device 1510 may block all network access to the host device 1505 other than the secure isolated tunnel 1530. The secure transaction device 1510 may also allow the trusted user application 1505a to access the secure resource system 1520 through the secure isolated tunnel 1530. Access attempts by the untrusted user application 1505b and/or the malware 1505c may be blocked as attempts to access the unsecured network 1540.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

The invention claimed is:

1. A method comprising:
   establishing, by a secure transaction device having a secure transaction device processor, redirection protocols in a host device having a host device processor different than the secure transaction device processor, the host device having a host device network connection, the secure transaction device having a secure transaction device network connection different than the host device network connection, the redirection protocols automatically causing the host device to redirect network traffic to the secure transaction device when first conditions including a condition that the secure transaction device is coupled to the host device are satisfied, the secure transaction device network connection configured to use network configuration details of the host device network connection to mimic the host device network connection to render the secure transaction device transparent to a remote network resource; and
   when the first conditions are satisfied,
      receiving, by the secure transaction device from the host device, outbound network traffic originated by a host application on the host device, the outbound network traffic directed to the remote network resource, the remote network resource being remote from the secure transaction device and from the host device;

establishing, by the secure transaction device, a secure tunnel between the secure transaction device network connection and the remote network resource; and transmitting the outbound network traffic via the secure tunnel to the remote network resource;

the host device being configured to, when second conditions different than the first conditions are satisfied, either transmit the outbound network traffic from the host application via the host device network connection to the remote network resource or block the outbound network traffic from the host application via the host device network connection to the remote network resource.

2. The method of claim 1, wherein the host application comprises a stand-alone application resident on the host device, or an interface resident on the host device that cooperates with a server application resident on at least one server.

3. The method of claim 1, further comprising determining whether the host application is authorized to access the remote network resource.

4. The method of claim 3, wherein the determining whether the host application is authorized to access the remote network resource comprises looking up permissions of the host application on the security policy.

5. The method of claim 1, further comprising determining whether a user of the host application has permission to access sensitive information on the remote network resource.

6. The method of claim 1, wherein the secure transaction device is a device coupled externally to the host device.

7. The method of claim 1, wherein the secure transaction device is a device coupled internally to the host device.

8. The method of claim 1, wherein the establishing redirection protocols in the host device includes injecting redirection code into an operating system of the host device.

9. The method of claim 1, wherein the network configuration details include network protocols and network addresses.

10. A secure transaction device comprising:

a secure transaction device processor;

a secure transaction device network connection; and memory storing computer code that, when processed by the secure transaction device processor, is configured to cause the secure transaction device to perform:

establishing redirection protocols in a host device having a host device processor different than the secure transaction device processor, the host device having a host device network connection, the secure transaction device having a secure transaction device network connection different than the host device network connection, the redirection protocols automatically causing the host device to redirect network traffic to the secure transaction device when first conditions including a condition that the secure transaction device is coupled to the host device are satisfied, the secure transaction device network connection configured to use network configuration details of the host device network connection to mimic the host device network connection to render the secure transaction device transparent to a remote network resource; and when the first conditions are satisfied, receiving outbound network traffic originated by a host application on the host device, the outbound network traffic directed to the remote network resource, the remote network resource being remote from the secure transaction device and from the host device;

establishing a secure tunnel between the secure transaction device network connection and the remote network resource; and transmitting the outbound network traffic via the secure tunnel to the remote network resource;

the host device being configured to, when second conditions different than the first conditions are satisfied, either transmit the outbound network traffic from the host application via the host device network connection to the remote network resource or block the outbound network traffic from the host application via the host device network connection to the remote network resource.

11. The secure transaction device of claim 10, wherein the host application comprises a stand-alone application resident on the host device, or an interface resident on the host device that cooperates with a server application resident on at least one server.

12. The secure transaction device of claim 10, wherein the computer code is further configured to cause the secure transaction device to perform determining whether the host application is authorized to access the remote network resource.

13. The secure transaction device of claim 12, wherein the computer code configured to cause the secure transaction device to perform determining whether the host application is authorized to access the remote network resource comprises computer code configured to cause the secure transaction device to perform looking up permissions of the host application on the security policy.

14. The secure transaction device of claim 10, wherein the computer code is further configured to cause the secure transaction device to perform determining whether a user of the host application has permission to access sensitive information on the remote network resource.

15. The secure transaction device of claim 10, wherein the secure transaction device is a device coupled externally to the host device.

16. The secure transaction device of claim 10, wherein the secure transaction device is a device coupled internally to the host device.

17. The secure transaction device of claim 10, wherein the computer code configured to cause the secure transaction device to perform establishing redirection protocols in the host device comprises computer code configured to cause the secure transaction device to perform injecting redirection code into an operating system of the host device.

18. The secure transaction device of claim 10, wherein the network configuration details include network protocols and network addresses.

19. A non-transitory computer-readable medium comprising computer code configured to instruct one or more processors to perform:

establishing, by a secure transaction device having a secure transaction device processor, redirection protocols in a host device having a host device processor different than the secure transaction device processor, the host device having a host device network connection, the secure transaction device having a secure transaction device network connection different than the host device network connection, the redirection protocols automatically causing the host device to redirect network traffic to the secure transaction device when first conditions including a condition that the secure transaction device is coupled to the host device are satisfied, the secure transaction device network connection configured to use network configuration details of the host device network connection to mimic the host device network connection to render the secure transaction device transparent to a remote network resource; and when the first conditions are satisfied,
- receiving, by the secure transaction device from the host device, outbound network traffic originated by a host application on the host device, the outbound network traffic directed to the remote network resource, the remote network resource being remote from the secure transaction device and from the host device;
- establishing, by the secure transaction device, a secure tunnel between the secure transaction device network connection and the remote network resource; and
- transmitting the outbound network traffic via the secure tunnel to the remote network resource;

the host device being configured to, when second conditions different than the first conditions are satisfied, either transmit the outbound network traffic from the host application via the host device network connection to the remote network resource or block the outbound network traffic from the host application via the host device network connection to the remote network resource.

* * * * *